US008525703B2

(12) United States Patent
McCarthy et al.

(10) Patent No.: US 8,525,703 B2
(45) Date of Patent: Sep. 3, 2013

(54) INTERIOR REARVIEW MIRROR SYSTEM

(75) Inventors: Kevin C. McCarthy, Tucson, AZ (US); Niall R. Lynam, Holland, MI (US)

(73) Assignee: Donnelly Corporation, Holland, MI (US)

(*) Notice: Subject to any disclaimer, the term of this patent is extended or adjusted under 35 U.S.C. 154(b) by 361 days.

(21) Appl. No.: 13/050,133

(22) Filed: Mar. 17, 2011

(65) Prior Publication Data

US 2011/0166785 A1     Jul. 7, 2011

Related U.S. Application Data

(63) Continuation of application No. 12/551,849, filed on Sep. 1, 2009, now Pat. No. 7,916,043, which is a continuation of application No. 11/935,795, filed on Nov. 6, 2007, now Pat. No. 7,583,204, which is a continuation of application No. 11/053,436, filed on Feb. 8, 2005, now Pat. No. 7,382,289, which is a continuation of application No. 10/777,812, filed on Feb. 12, 2004, now Pat. No. 6,909,361, which is a continuation of application No. 09/839,678, filed on Apr. 20, 2001, now Pat. No. 6,693,517, said application No. 10/777,812 is a continuation-in-part of application No. 10/365,794, filed on Feb. 13, 2003, now Pat. No. 6,832,719, which is a continuation of (Continued)

(51) Int. Cl.
*G08G 1/123* (2006.01)

(52) U.S. Cl.
USPC ............. 340/995.1; 340/995.12; 340/995.14; 701/409

(58) Field of Classification Search
USPC .................... 340/995.1, 995.12, 995.17, 988, 340/995.14; 345/629; 701/409, 410
See application file for complete search history.

(56) References Cited

U.S. PATENT DOCUMENTS

| 1,096,452 A | 5/1914 | Perrin |
| 1,563,258 A | 11/1925 | Cunningham |

(Continued)

FOREIGN PATENT DOCUMENTS

| AU | A-40317/95 | 2/1995 |
| CN | 1189224 | 7/1998 |

(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Toan N Pham
(74) *Attorney, Agent, or Firm* — Gardner, Linn, Burkhart & Flory, LLP

(57) ABSTRACT

A vehicular interior rearview mirror system includes an interior rearview mirror assembly, a global positioning system operable to determine a geographical location of the vehicle, and a display device. Data relevant to the geographical location of the vehicle is carried from an external provider to the vehicle via a wireless communication link. The data may be wirelessly communicated from the external provider to the vehicle responsive to at least one of (a) location of the vehicle, (b) identity of the vehicle and (c) directional heading of the vehicle, and the data may be at least in part customized to the geographic location of the vehicle. The interior rearview mirror system may include a link with a mobile accessory that may be a personal accessory of an occupant of the vehicle, and the mobile accessory may include at least one of a keypad, a touch pad and a stylus-actuated screen.

26 Claims, 3 Drawing Sheets

Related U.S. Application Data

(63) application No. 09/687,778, filed on Oct. 13, 2000, now Pat. No. 6,547,133, which is a continuation of application No. 09/057,428, filed on Apr. 8, 1998, now Pat. No. 6,158,655, said application No. 10/777,812 is a continuation-in-part of application No. 10/755,627, filed on Jan. 12, 2004, now Pat. No. 7,158,881, which is a continuation of application No. 10/287,178, filed on Nov. 4, 2002, now Pat. No. 6,678,614, which is a continuation of application No. 09/799,414, filed on Mar. 5, 2001, now Pat. No. 6,477,464, said application No. 13/050,133 is a continuation-in-part of application No. 12/536,930, filed on Aug. 6, 2009, now Pat. No. 8,044,776, which is a continuation of application No. 12/052,341, filed on Mar. 20, 2008, now Pat. No. 7,579,940, which is a continuation of application No. 11/625,374, filed on Jan. 22, 2007, now Pat. No. 7,579,939, which is a continuation of application No. 10/755,915, filed on Jan. 13, 2004, now Pat. No. 7,446,650, which is a continuation of application No. 09/793,002, filed on Feb. 26, 2001, now Pat. No. 6,690,268.

(60) Provisional application No. 60/199,676, filed on Apr. 21, 2000, provisional application No. 60/187,960, filed on Mar. 9, 2000, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000.

(56) References Cited

U.S. PATENT DOCUMENTS

| | | |
|---|---|---|
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,841,732 A | 10/1974 | Marks |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,447,808 A | 5/1984 | Marcus |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,581,827 A | 4/1986 | Higashi |
| 4,588,267 A | 5/1986 | Pastore |

| | | | | | |
|---|---|---|---|---|---|
| 4,603,946 A | 8/1986 | Kato et al. | 4,909,606 A | 3/1990 | Wada et al. |
| 4,623,222 A | 11/1986 | Itoh et al. | 4,910,591 A | 3/1990 | Petrossian et al. |
| 4,625,210 A | 11/1986 | Sagl | 4,916,374 A | 4/1990 | Schierbeek et al. |
| 4,626,850 A | 12/1986 | Chey | 4,926,170 A | 5/1990 | Beggs et al. |
| 4,630,040 A | 12/1986 | Haertling | 4,930,742 A | 6/1990 | Schofield et al. |
| 4,630,109 A | 12/1986 | Barton | 4,933,814 A | 6/1990 | Sanai |
| 4,630,904 A | 12/1986 | Pastore | 4,935,665 A | 6/1990 | Murata |
| 4,634,835 A | 1/1987 | Suzuki | 4,936,533 A | 6/1990 | Adams et al. |
| 4,635,033 A | 1/1987 | Inukai et al. | 4,937,796 A | 6/1990 | Tendler |
| 4,636,782 A | 1/1987 | Nakamura et al. | 4,937,945 A | 7/1990 | Schofield et al. |
| 4,638,287 A | 1/1987 | Umebayashi et al. | 4,943,796 A | 7/1990 | Lee |
| 4,646,210 A | 2/1987 | Skogler et al. | 4,948,242 A | 8/1990 | Desmond et al. |
| 4,652,090 A | 3/1987 | Uchikawa et al. | 4,953,305 A | 9/1990 | Van Lente et al. |
| 4,655,549 A | 4/1987 | Suzuki et al. | 4,956,591 A | 9/1990 | Schierbeek et al. |
| 4,665,311 A | 5/1987 | Cole | 4,957,349 A | 9/1990 | Clerc et al. |
| 4,665,430 A | 5/1987 | Hiroyasu | 4,959,247 A | 9/1990 | Moser et al. |
| 4,669,827 A | 6/1987 | Fukada et al. | 4,959,865 A | 9/1990 | Stettiner et al. |
| 4,671,615 A | 6/1987 | Fukada et al. | 4,970,653 A | 11/1990 | Kenue |
| 4,671,619 A | 6/1987 | Kamimori et al. | 4,973,844 A | 11/1990 | O'Farrell et al. |
| 4,678,281 A | 7/1987 | Bauer | 4,974,122 A | 11/1990 | Shaw |
| 4,679,906 A | 7/1987 | Brandenburg | 4,978,196 A | 12/1990 | Suzuki et al. |
| 4,682,083 A | 7/1987 | Alley | 4,983,951 A | 1/1991 | Igarashi et al. |
| 4,692,798 A | 9/1987 | Seko et al. | 4,985,809 A | 1/1991 | Matsui et al. |
| 4,694,295 A | 9/1987 | Miller et al. | 4,987,357 A | 1/1991 | Masaki |
| 4,697,883 A | 10/1987 | Suzuki et al. | 4,996,083 A | 2/1991 | Moser et al. |
| 4,701,022 A | 10/1987 | Jacob | 5,001,386 A | 3/1991 | Sullivan et al. |
| 4,702,566 A | 10/1987 | Tukude et al. | 5,001,558 A | 3/1991 | Burley et al. |
| 4,704,740 A | 11/1987 | McKee et al. | 5,005,213 A | 4/1991 | Hanson et al. |
| 4,711,544 A | 12/1987 | Iino et al. | 5,006,971 A | 4/1991 | Jerkins |
| 4,712,879 A | 12/1987 | Lynam et al. | 5,012,077 A | 4/1991 | Takano |
| 4,713,685 A | 12/1987 | Nishimura et al. | 5,014,167 A | 5/1991 | Roberts |
| RE32,576 E | 1/1988 | Pastore | 5,016,988 A | 5/1991 | Iimura |
| 4,718,756 A | 1/1988 | Lancaster | 5,016,996 A | 5/1991 | Ueno |
| 4,721,364 A | 1/1988 | Itoh et al. | 5,017,903 A | 5/1991 | Krippelz, Sr. |
| 4,729,068 A | 3/1988 | Ohe | 5,018,839 A | 5/1991 | Yamamoto et al. |
| 4,729,076 A | 3/1988 | Masami et al. | 5,027,200 A | 6/1991 | Petrossian et al. |
| 4,731,669 A | 3/1988 | Hayashi et al. | 5,037,182 A | 8/1991 | Groves et al. |
| 4,733,335 A | 3/1988 | Serizawa et al. | 5,038,255 A | 8/1991 | Nashihashi et al. |
| 4,733,336 A | 3/1988 | Skogler et al. | 5,052,163 A | 10/1991 | Czekala |
| 4,740,838 A | 4/1988 | Mase et al. | 5,056,899 A | 10/1991 | Warszawski |
| 4,761,061 A | 8/1988 | Nishiyama et al. | 5,057,974 A | 10/1991 | Mizobe |
| 4,773,740 A | 9/1988 | Kawakami et al. | 5,058,851 A | 10/1991 | Lawlor et al. |
| 4,780,752 A | 10/1988 | Angerstein et al. | 5,059,015 A | 10/1991 | Tran |
| 4,781,436 A | 11/1988 | Armbruster | 5,066,108 A | 11/1991 | McDonald |
| 4,789,904 A | 12/1988 | Peterson | 5,066,112 A | 11/1991 | Lynam et al. |
| 4,793,690 A | 12/1988 | Gahan et al. | 5,069,535 A | 12/1991 | Baucke et al. |
| 4,793,695 A | 12/1988 | Wada et al. | 5,070,323 A | 12/1991 | Iino et al. |
| 4,794,261 A | 12/1988 | Rosen | 5,072,380 A | 12/1991 | Randelman et al. |
| D299,491 S | 1/1989 | Masuda | 5,073,012 A | 12/1991 | Lynam |
| 4,799,768 A | 1/1989 | Gahan | 5,076,673 A | 12/1991 | Lynam et al. |
| 4,803,599 A | 2/1989 | Trine et al. | 5,076,674 A | 12/1991 | Lynam |
| 4,807,096 A | 2/1989 | Skogler et al. | 5,078,480 A | 1/1992 | Warszawski |
| 4,820,933 A | 4/1989 | Hong et al. | 5,096,287 A | 3/1992 | Kakinami et al. |
| 4,825,232 A | 4/1989 | Howdle | 5,100,095 A | 3/1992 | Haan et al. |
| 4,826,289 A | 5/1989 | Vandenbrink et al. | 5,101,139 A | 3/1992 | Lechter |
| 4,827,086 A | 5/1989 | Rockwell | 5,105,127 A | 4/1992 | Lavaud et al. |
| 4,837,551 A | 6/1989 | Iino | 5,115,346 A | 5/1992 | Lynam |
| 4,842,378 A | 6/1989 | Flasck et al. | 5,117,346 A | 5/1992 | Gard |
| 4,845,402 A | 7/1989 | Smith | 5,119,220 A | 6/1992 | Narita et al. |
| 4,847,772 A | 7/1989 | Michalopoulos et al. | 5,121,200 A | 6/1992 | Choi |
| 4,855,161 A | 8/1989 | Moser et al. | 5,122,619 A | 6/1992 | Dlubak |
| 4,855,550 A | 8/1989 | Schultz, Jr. | 5,123,077 A | 6/1992 | Endo et al. |
| 4,859,813 A | 8/1989 | Rockwell | 5,124,845 A | 6/1992 | Shimojo |
| 4,859,867 A | 8/1989 | Larson et al. | 5,124,890 A | 6/1992 | Choi et al. |
| 4,860,171 A | 8/1989 | Kojima | 5,128,799 A | 7/1992 | Byker |
| 4,862,594 A | 9/1989 | Schierbeek et al. | 5,130,898 A | 7/1992 | Akahane |
| 4,871,917 A | 10/1989 | O'Farrell et al. | 5,131,154 A | 7/1992 | Schierbeek et al. |
| 4,872,051 A | 10/1989 | Dye | 5,134,507 A | 7/1992 | Ishii |
| 4,882,466 A | 11/1989 | Friel | 5,134,549 A | 7/1992 | Yokoyama |
| 4,882,565 A | 11/1989 | Gallmeyer | 5,135,298 A | 8/1992 | Feltman |
| 4,883,349 A | 11/1989 | Mittelhäuser | 5,136,483 A | 8/1992 | Schöniger et al. |
| 4,884,135 A | 11/1989 | Schiffman | 5,140,455 A | 8/1992 | Varaprasad et al. |
| 4,886,960 A | 12/1989 | Molyneux et al. | 5,140,465 A | 8/1992 | Yasui et al. |
| 4,889,412 A | 12/1989 | Clerc et al. | 5,142,407 A | 8/1992 | Varaprasad et al. |
| 4,891,828 A | 1/1990 | Kawazoe | 5,145,609 A | 9/1992 | Varaprasad et al. |
| 4,892,345 A | 1/1990 | Rachael, III | 5,150,232 A | 9/1992 | Gunkima et al. |
| 4,902,103 A | 2/1990 | Miyake et al. | 5,151,816 A | 9/1992 | Varaprasad et al. |
| 4,902,108 A | 2/1990 | Byker | 5,151,824 A | 9/1992 | O'Farrell |
| 4,906,085 A | 3/1990 | Sugihara et al. | 5,154,617 A | 10/1992 | Suman et al. |

| | | | | | | |
|---|---|---|---|---|---|---|
| 5,158,638 A | 10/1992 | Osanami et al. | | 5,422,756 A | 6/1995 | Weber |
| 5,160,200 A | 11/1992 | Cheselske | | 5,424,726 A | 6/1995 | Beymer |
| 5,160,201 A | 11/1992 | Wrobel | | 5,424,865 A | 6/1995 | Lynam |
| 5,166,815 A | 11/1992 | Elderfield | | 5,424,952 A | 6/1995 | Asayama |
| 5,168,378 A | 12/1992 | Black et al. | | 5,426,524 A | 6/1995 | Wada et al. |
| 5,173,881 A | 12/1992 | Sindle | | 5,430,431 A | 7/1995 | Nelson |
| 5,177,031 A | 1/1993 | Buchmann et al. | | 5,432,496 A | 7/1995 | Lin |
| 5,178,448 A | 1/1993 | Adams et al. | | 5,432,626 A | 7/1995 | Sasuga et al. |
| 5,179,471 A | 1/1993 | Caskey et al. | | 5,436,741 A | 7/1995 | Crandall |
| 5,183,099 A | 2/1993 | Bechu | | 5,437,931 A | 8/1995 | Tsai et al. |
| 5,184,956 A | 2/1993 | Langlarais et al. | | 5,439,305 A | 8/1995 | Santo |
| 5,189,537 A | 2/1993 | O'Farrell | | 5,444,478 A | 8/1995 | Lelong et al. |
| 5,193,029 A | 3/1993 | Schofield et al. | | 5,446,576 A | 8/1995 | Lynam et al. |
| 5,197,562 A | 3/1993 | Kakinami et al. | | 5,455,716 A | 10/1995 | Suman et al. |
| 5,202,950 A | 4/1993 | Arego et al. | | 5,461,361 A | 10/1995 | Moore |
| 5,207,492 A | 5/1993 | Roberts | | D363,920 S | 11/1995 | Roberts et al. |
| 5,210,967 A | 5/1993 | Brown | | 5,469,187 A | 11/1995 | Yaniv |
| 5,212,819 A | 5/1993 | Wada | | 5,469,298 A | 11/1995 | Suman et al. |
| 5,214,408 A | 5/1993 | Asayama | | 5,475,366 A | 12/1995 | Van Lente et al. |
| 5,217,794 A | 6/1993 | Schrenk | | 5,475,494 A | 12/1995 | Nishida et al. |
| 5,223,814 A | 6/1993 | Suman | | 5,481,409 A | 1/1996 | Roberts |
| 5,223,844 A | 6/1993 | Mansell et al. | | 5,483,453 A | 1/1996 | Uemura et al. |
| 5,229,975 A | 7/1993 | Truesdell et al. | | 5,485,161 A | 1/1996 | Vaughn |
| 5,230,400 A | 7/1993 | Kakinama et al. | | 5,485,378 A | 1/1996 | Franke et al. |
| 5,233,461 A | 8/1993 | Dornan et al. | | 5,485,520 A | 1/1996 | Chaum et al. |
| 5,235,316 A | 8/1993 | Qualizza | | 5,487,522 A | 1/1996 | Hook |
| 5,239,405 A | 8/1993 | Varaprasad et al. | | 5,488,496 A | 1/1996 | Pine |
| 5,239,406 A | 8/1993 | Lynam | | 5,497,305 A | 3/1996 | Pastrick et al. |
| 5,243,417 A | 9/1993 | Pollard | | 5,497,306 A | 3/1996 | Pastrick |
| 5,245,422 A | 9/1993 | Borcherts et al. | | 5,500,760 A | 3/1996 | Varaprasad et al. |
| 5,252,354 A | 10/1993 | Cronin et al. | | 5,506,701 A | 4/1996 | Ichikawa |
| 5,253,109 A | 10/1993 | O'Farrell et al. | | 5,509,606 A | 4/1996 | Breithaupt et al. |
| 5,255,442 A | 10/1993 | Schierbeek et al. | | 5,510,983 A | 4/1996 | Iino |
| 5,260,626 A | 11/1993 | Takase et al. | | 5,515,448 A | 5/1996 | Nishitani |
| 5,277,986 A | 1/1994 | Cronin et al. | | 5,519,621 A | 5/1996 | Worthman |
| 5,280,555 A | 1/1994 | Ainsburg | | 5,521,744 A | 5/1996 | Mazurek |
| 5,285,060 A | 2/1994 | Larson et al. | | 5,521,760 A | 5/1996 | De Young et al. |
| 5,289,321 A | 2/1994 | Secor | | 5,523,811 A | 6/1996 | Wada et al. |
| 5,296,924 A | 3/1994 | de Saint Blancard et al. | | 5,523,877 A | 6/1996 | Lynam |
| 5,303,075 A | 4/1994 | Wada et al. | | 5,525,264 A | 6/1996 | Cronin et al. |
| 5,303,205 A | 4/1994 | Gauthier et al. | | 5,525,977 A | 6/1996 | Suman |
| 5,304,980 A | 4/1994 | Maekawa | | 5,528,422 A | 6/1996 | Roberts |
| 5,305,012 A | 4/1994 | Faris | | 5,528,474 A | 6/1996 | Roney et al. |
| 5,307,136 A | 4/1994 | Saneyoshi | | 5,529,138 A | 6/1996 | Shaw et al. |
| 5,310,999 A | 5/1994 | Claus et al. | | 5,530,240 A | 6/1996 | Larson et al. |
| 5,313,335 A | 5/1994 | Gray et al. | | 5,530,420 A | 6/1996 | Tsuchiya et al. |
| 5,325,096 A | 6/1994 | Pakett | | 5,530,421 A | 6/1996 | Marshall et al. |
| 5,325,386 A | 6/1994 | Jewell et al. | | 5,535,056 A | 7/1996 | Caskey et al. |
| 5,327,288 A | 7/1994 | Wellington et al. | | 5,535,144 A | 7/1996 | Kise |
| 5,330,149 A | 7/1994 | Haan et al. | | 5,539,397 A | 7/1996 | Asanuma et al. |
| 5,331,312 A | 7/1994 | Kudoh | | 5,541,590 A | 7/1996 | Nishio |
| 5,331,358 A | 7/1994 | Schurle et al. | | 5,550,677 A | 8/1996 | Schofield et al. |
| 5,339,075 A | 8/1994 | Abst et al. | | 5,555,172 A | 9/1996 | Potter |
| 5,339,529 A | 8/1994 | Lindberg | | 5,561,333 A | 10/1996 | Darius |
| 5,341,437 A | 8/1994 | Nakayama | | 5,566,244 A | 10/1996 | ul Azam et al. |
| D351,370 S | 10/1994 | Lawlor et al. | | 5,567,360 A | 10/1996 | Varaprasad et al. |
| 5,354,965 A | 10/1994 | Lee | | 5,568,316 A | 10/1996 | Schrenck et al. |
| 5,355,118 A | 10/1994 | Fukuhara | | 5,570,127 A | 10/1996 | Schmidt |
| 5,355,245 A | 10/1994 | Lynam | | 5,572,354 A | 11/1996 | Desmond et al. |
| 5,355,284 A | 10/1994 | Roberts | | 5,574,426 A | 11/1996 | Shisgal et al. |
| 5,361,190 A | 11/1994 | Roberts et al. | | 5,574,443 A | 11/1996 | Hsieh |
| 5,363,294 A | 11/1994 | Yamamoto et al. | | 5,575,552 A | 11/1996 | Faloon et al. |
| 5,371,659 A | 12/1994 | Pastrick et al. | | 5,576,687 A | 11/1996 | Blank et al. |
| 5,373,482 A | 12/1994 | Gauthier | | 5,576,854 A | 11/1996 | Schmidt et al. |
| 5,379,146 A | 1/1995 | Defendini | | 5,576,975 A | 11/1996 | Sasaki et al. |
| 5,386,285 A | 1/1995 | Asayama | | 5,578,404 A | 11/1996 | Kliem |
| 5,386,306 A | 1/1995 | Gunjima et al. | | 5,587,236 A | 12/1996 | Agrawal et al. |
| 5,400,158 A | 3/1995 | Ohnishi et al. | | 5,587,699 A | 12/1996 | Faloon et al. |
| 5,402,103 A | 3/1995 | Tashiro | | 5,590,038 A | 12/1996 | Pitroda |
| 5,406,395 A | 4/1995 | Wilson et al. | | 5,593,221 A | 1/1997 | Evanicky et al. |
| 5,406,414 A | 4/1995 | O'Farrell et al. | | 5,594,222 A | 1/1997 | Caldwell |
| 5,408,353 A | 4/1995 | Nichols et al. | | 5,594,560 A | 1/1997 | Jelley et al. |
| 5,408,357 A | 4/1995 | Beukema | | 5,594,615 A | 1/1997 | Spijkerman et al. |
| 5,410,346 A | 4/1995 | Saneyoshi et al. | | 5,602,542 A | 2/1997 | Widmann et al. |
| 5,414,439 A | 5/1995 | Groves et al. | | 5,602,670 A | 2/1997 | Keegan |
| 5,414,461 A | 5/1995 | Kishi et al. | | 5,603,104 A | 2/1997 | Phelps, III et al. |
| 5,416,313 A | 5/1995 | Larson et al. | | 5,608,550 A | 3/1997 | Epstein et al. |
| 5,416,478 A | 5/1995 | Morinaga | | 5,609,652 A | 3/1997 | Yamada et al. |
| 5,418,610 A | 5/1995 | Fischer | | 5,610,380 A | 3/1997 | Nicolaisen |

| | | | | | |
|---|---|---|---|---|---|
| 5,610,756 A | 3/1997 | Lynam et al. | 5,760,962 A | 6/1998 | Schofield et al. |
| 5,611,966 A | 3/1997 | Varaprasad et al. | 5,761,094 A | 6/1998 | Olson et al. |
| 5,614,885 A | 3/1997 | Van Lente et al. | 5,762,823 A | 6/1998 | Hikmet |
| 5,615,023 A | 3/1997 | Yang | 5,764,139 A | 6/1998 | Nojima et al. |
| 5,615,857 A | 4/1997 | Hook | 5,765,940 A | 6/1998 | Levy et al. |
| 5,617,085 A | 4/1997 | Tsutsumi et al. | 5,767,793 A | 6/1998 | Agravante et al. |
| 5,619,374 A | 4/1997 | Roberts | 5,768,020 A | 6/1998 | Nagao |
| 5,619,375 A | 4/1997 | Roberts | 5,775,762 A | 7/1998 | Vitito |
| 5,626,800 A | 5/1997 | Williams et al. | 5,777,779 A | 7/1998 | Hashimoto et al. |
| 5,631,089 A | 5/1997 | Center, Jr. et al. | 5,780,160 A | 7/1998 | Allemand et al. |
| 5,631,638 A | 5/1997 | Kaspar et al. | 5,786,772 A | 7/1998 | Schofield et al. |
| 5,631,639 A | 5/1997 | Hibino et al. | 5,788,357 A | 8/1998 | Muth et al. |
| 5,632,092 A | 5/1997 | Blank et al. | 5,790,298 A | 8/1998 | Tonar |
| 5,632,551 A | 5/1997 | Roney et al. | 5,790,502 A | 8/1998 | Horinouchi et al. |
| 5,634,709 A | 6/1997 | Iwama | 5,790,973 A | 8/1998 | Blaker et al. |
| 5,640,216 A | 6/1997 | Hasegawa et al. | 5,793,027 A | 8/1998 | Baik |
| 5,642,238 A | 6/1997 | Sala | 5,793,308 A | 8/1998 | Rosinski et al. |
| 5,644,851 A | 7/1997 | Blank et al. | 5,793,420 A | 8/1998 | Schmidt |
| 5,646,614 A | 7/1997 | Abersfelder et al. | 5,796,094 A | 8/1998 | Schofield et al. |
| 5,649,756 A | 7/1997 | Adams et al. | 5,796,176 A | 8/1998 | Kramer et al. |
| 5,649,758 A | 7/1997 | Dion | 5,798,057 A | 8/1998 | Hikmet |
| 5,650,765 A | 7/1997 | Park | 5,798,575 A | 8/1998 | O'Farrell et al. |
| 5,650,929 A | 7/1997 | Potter et al. | 5,798,688 A | 8/1998 | Schofield |
| 5,661,455 A | 8/1997 | Van Lente et al. | 5,800,918 A | 9/1998 | Chartier et al. |
| 5,661,651 A | 8/1997 | Geschke et al. | 5,802,727 A | 9/1998 | Blank et al. |
| 5,661,804 A | 8/1997 | Dykema et al. | 5,803,579 A | 9/1998 | Turnbull et al. |
| 5,662,375 A | 9/1997 | Adams et al. | 5,805,330 A | 9/1998 | Byker et al. |
| 5,663,548 A | 9/1997 | Hayashi et al. | 5,805,367 A | 9/1998 | Kanazawa |
| 5,666,167 A | 9/1997 | Aviv | 5,806,879 A | 9/1998 | Hamada et al. |
| 5,667,289 A | 9/1997 | Akahane et al. | 5,806,965 A | 9/1998 | Deese |
| 5,668,663 A | 9/1997 | Varaprasad et al. | 5,808,197 A | 9/1998 | Dao |
| 5,668,675 A | 9/1997 | Fredricks | 5,808,566 A | 9/1998 | Behr et al. |
| 5,669,698 A | 9/1997 | Veldman et al. | 5,808,589 A | 9/1998 | Fergason |
| 5,669,699 A | 9/1997 | Pastrick et al. | 5,808,713 A | 9/1998 | Broer et al. |
| 5,669,704 A | 9/1997 | Pastrick | 5,808,777 A | 9/1998 | Lynam et al. |
| 5,669,705 A | 9/1997 | Pastrick et al. | 5,808,778 A | 9/1998 | Bauer et al. |
| 5,670,935 A | 9/1997 | Schofield et al. | 5,812,321 A | 9/1998 | Schierbeek et al. |
| 5,671,996 A | 9/1997 | Bos et al. | 5,813,745 A | 9/1998 | Fant, Jr. et al. |
| 5,673,994 A | 10/1997 | Fant, Jr. et al. | 5,818,625 A | 10/1998 | Forgette et al. |
| 5,673,999 A | 10/1997 | Koenck | 5,820,097 A | 10/1998 | Spooner |
| 5,677,598 A | 10/1997 | De Hair et al. | 5,820,245 A | 10/1998 | Desmond et al. |
| 5,679,283 A | 10/1997 | Tonar et al. | 5,822,023 A | 10/1998 | Suman et al. |
| 5,680,123 A | 10/1997 | Lee | 5,823,654 A | 10/1998 | Pastrick et al. |
| 5,680,245 A | 10/1997 | Lynam | 5,825,527 A | 10/1998 | Forgette et al. |
| 5,680,263 A | 10/1997 | Zimmermann et al. | 5,835,166 A | 11/1998 | Hall et al. |
| 5,686,975 A | 11/1997 | Lipton | 5,837,994 A | 11/1998 | Stam et al. |
| 5,686,979 A | 11/1997 | Weber et al. | 5,844,505 A | 12/1998 | Van Ryzin |
| 5,689,241 A | 11/1997 | Clarke, Sr. et al. | 5,848,373 A | 12/1998 | DeLorme et al. |
| 5,689,370 A | 11/1997 | Tonar et al. | 5,850,176 A | 12/1998 | Kinoshita et al. |
| 5,691,848 A | 11/1997 | Van Lente et al. | 5,850,205 A | 12/1998 | Blouin |
| 5,692,819 A | 12/1997 | Mitsutake et al. | 5,863,116 A | 1/1999 | Pastrick et al. |
| 5,696,529 A | 12/1997 | Evanicky et al. | 5,864,419 A | 1/1999 | Lynam |
| 5,696,567 A | 12/1997 | Wada et al. | 5,867,801 A | 2/1999 | Denny |
| 5,699,044 A | 12/1997 | Van Lente et al. | 5,871,275 A | 2/1999 | O'Farrell et al. |
| 5,699,188 A | 12/1997 | Gilbert et al. | 5,871,843 A | 2/1999 | Yoneda et al. |
| 5,703,568 A | 12/1997 | Hegyi | 5,872,513 A | 2/1999 | Fitzgibbon |
| 5,708,410 A | 1/1998 | Blank et al. | 5,877,707 A | 3/1999 | Kowalick |
| 5,708,415 A | 1/1998 | Van Lente et al. | 5,877,897 A | 3/1999 | Schofield et al. |
| 5,708,857 A | 1/1998 | Ishibashi | 5,878,353 A | 3/1999 | ul Azam et al. |
| 5,710,702 A | 1/1998 | Hayashi et al. | 5,878,370 A | 3/1999 | Olson |
| 5,715,093 A | 2/1998 | Schierbeek et al. | 5,879,074 A | 3/1999 | Pastrick |
| 5,724,187 A | 3/1998 | Varaprasad et al. | 5,883,605 A | 3/1999 | Knapp |
| 5,724,316 A | 3/1998 | Brunts | 5,883,739 A | 3/1999 | Ashihara et al. |
| 5,729,194 A | 3/1998 | Spears et al. | 5,888,431 A | 3/1999 | Tonar et al. |
| 5,737,226 A | 4/1998 | Olson et al. | 5,894,196 A | 4/1999 | McDermott |
| 5,741,966 A | 4/1998 | Handfield et al. | D409,540 S | 5/1999 | Muth |
| 5,744,227 A | 4/1998 | Bright et al. | 5,899,551 A | 5/1999 | Neijzen et al. |
| 5,745,050 A | 4/1998 | Nakagawa | 5,899,956 A | 5/1999 | Chan |
| 5,745,266 A | 4/1998 | Smith | 5,904,729 A | 5/1999 | Ruzicka |
| 5,748,172 A | 5/1998 | Song et al. | 5,910,854 A | 6/1999 | Varaprasad et al. |
| 5,748,287 A | 5/1998 | Takahashi et al. | 5,914,815 A | 6/1999 | Bos |
| 5,751,211 A | 5/1998 | Shirai et al. | 5,917,664 A | 6/1999 | O'Neill et al. |
| 5,751,246 A | 5/1998 | Hertel | 5,918,180 A | 6/1999 | Dimino |
| 5,751,390 A | 5/1998 | Crawford et al. | 5,922,176 A | 7/1999 | Caskey |
| 5,751,489 A | 5/1998 | Caskey et al. | 5,923,027 A | 7/1999 | Stam et al. |
| 5,754,099 A | 5/1998 | Nishimura et al. | 5,923,457 A | 7/1999 | Byker et al. |
| D394,833 S | 6/1998 | Muth | 5,924,212 A | 7/1999 | Domanski |
| 5,760,828 A | 6/1998 | Cortes | 5,926,087 A | 7/1999 | Busch et al. |
| 5,760,931 A | 6/1998 | Saburi et al. | 5,927,792 A | 7/1999 | Welling et al. |

| | | | | | | |
|---|---|---|---|---|---|---|
| 5,928,572 | A | 7/1999 | Tonar et al. | D427,128 | S | 6/2000 | Mathieu |
| 5,929,786 | A | 7/1999 | Schofield et al. | 6,072,391 | A | 6/2000 | Suzukie et al. |
| 5,931,555 | A | 8/1999 | Akahane et al. | 6,074,077 | A | 6/2000 | Pastrick et al. |
| 5,935,702 | A | 8/1999 | Macquart et al. | 6,074,777 | A | 6/2000 | Reimers et al. |
| 5,936,774 | A | 8/1999 | Street | 6,076,948 | A | 6/2000 | Bukosky et al. |
| 5,938,320 | A | 8/1999 | Crandall | 6,078,355 | A | 6/2000 | Zengel |
| 5,938,321 | A | 8/1999 | Bos et al. | 6,078,865 | A | 6/2000 | Koyanagi |
| 5,938,721 | A | 8/1999 | Dussell et al. | D428,372 | S | 7/2000 | Todd et al. |
| 5,940,011 | A | 8/1999 | Agravante et al. | D428,373 | S | 7/2000 | Todd et al. |
| 5,940,120 | A | 8/1999 | Frankhouse et al. | 6,082,881 | A | 7/2000 | Hicks |
| 5,940,201 | A | 8/1999 | Ash et al. | 6,084,700 | A | 7/2000 | Knapp et al. |
| 5,940,503 | A | 8/1999 | Palett et al. | 6,086,131 | A | 7/2000 | Bingle et al. |
| 5,942,895 | A | 8/1999 | Popovic et al. | 6,086,229 | A | 7/2000 | Pastrick |
| 5,947,586 | A | 9/1999 | Weber | 6,087,012 | A | 7/2000 | Varaprasad et al. |
| 5,949,331 | A | 9/1999 | Schofield et al. | 6,087,953 | A | 7/2000 | DeLine et al. |
| 5,949,506 | A | 9/1999 | Jones et al. | 6,091,343 | A | 7/2000 | Dykema et al. |
| 5,956,079 | A | 9/1999 | Ridgley | 6,093,976 | A | 7/2000 | Kramer et al. |
| 5,956,181 | A | 9/1999 | Lin | 6,094,618 | A | 7/2000 | Harada |
| 5,959,367 | A | 9/1999 | O'Farrell et al. | D428,842 | S | 8/2000 | Todd et al. |
| 5,959,555 | A | 9/1999 | Furuta | D429,202 | S | 8/2000 | Todd et al. |
| 5,959,577 | A | 9/1999 | Fan et al. | D430,088 | S | 8/2000 | Todd et al. |
| 5,962,833 | A | 10/1999 | Hayashi | 6,097,023 | A | 8/2000 | Schofield et al. |
| 5,963,247 | A | 10/1999 | Banitt | 6,097,316 | A | 8/2000 | Liaw et al. |
| 5,963,284 | A | 10/1999 | Jones et al. | 6,098,879 | A | 8/2000 | Terranova |
| 5,965,247 | A | 10/1999 | Jonza et al. | 6,099,131 | A | 8/2000 | Fletcher et al. |
| 5,968,538 | A | 10/1999 | Snyder, Jr. | 6,099,155 | A | 8/2000 | Pastrick et al. |
| 5,971,552 | A | 10/1999 | O'Farrell et al. | 6,102,546 | A | 8/2000 | Carter |
| 5,973,760 | A | 10/1999 | Dehmlow | 6,102,559 | A | 8/2000 | Nold et al. |
| 5,974,552 | A | 10/1999 | O'Farrell et al. | 6,104,552 | A | 8/2000 | Thau et al. |
| 5,975,715 | A | 11/1999 | Bauder | 6,106,121 | A | 8/2000 | Buckley et al. |
| 5,984,482 | A | 11/1999 | Rumsey et al. | 6,111,498 | A | 8/2000 | Jobes, I et al. |
| 5,986,730 | A | 11/1999 | Hansen et al. | 6,111,683 | A | 8/2000 | Cammenga et al. |
| 5,990,469 | A | 11/1999 | Bechtel et al. | 6,111,684 | A | 8/2000 | Forgette et al. |
| 5,990,625 | A | 11/1999 | Meissner et al. | 6,111,685 | A | 8/2000 | Tench et al. |
| 5,995,180 | A | 11/1999 | Moriwaki et al. | 6,111,696 | A | 8/2000 | Allen et al. |
| 5,995,898 | A | 11/1999 | Tuttle | 6,115,086 | A | 9/2000 | Rosen |
| 5,998,617 | A | 12/1999 | Srinivasa et al. | 6,115,651 | A | 9/2000 | Cruz |
| 5,998,929 | A | 12/1999 | Bechtel et al. | 6,116,743 | A | 9/2000 | Hoek |
| 6,000,823 | A | 12/1999 | Desmond et al. | 6,118,219 | A | 9/2000 | Okigami et al. |
| 6,001,486 | A | 12/1999 | Varaprasad et al. | 6,122,597 | A | 9/2000 | Saneyoshi et al. |
| 6,002,511 | A | 12/1999 | Varaprasad et al. | 6,122,921 | A | 9/2000 | Brezoczky et al. |
| 6,002,544 | A | 12/1999 | Yatsu | 6,124,647 | A | 9/2000 | Marcus et al. |
| 6,002,983 | A | 12/1999 | Alland et al. | 6,124,886 | A | 9/2000 | DeLine et al. |
| 6,005,724 | A | 12/1999 | Todd | 6,127,919 | A | 10/2000 | Wylin |
| 6,007,222 | A | 12/1999 | Thau | 6,127,945 | A | 10/2000 | Mura-Smith |
| 6,008,486 | A | 12/1999 | Stam et al. | 6,128,576 | A | 10/2000 | Nishimoto et al. |
| 6,008,871 | A | 12/1999 | Okumura | 6,130,421 | A | 10/2000 | Bechtel et al. |
| 6,009,359 | A | 12/1999 | El-Hakim et al. | 6,130,448 | A | 10/2000 | Bauer et al. |
| 6,011,518 | A | 1/2000 | Yamagishi | 6,132,072 | A | 10/2000 | Turnbull et al. |
| 6,016,035 | A | 1/2000 | Eberspächer et al. | 6,137,620 | A | 10/2000 | Guarr et al. |
| 6,016,215 | A | 1/2000 | Byker | 6,139,171 | A | 10/2000 | Waldmann |
| 6,019,411 | A | 2/2000 | Carter et al. | 6,139,172 | A | 10/2000 | Bos et al. |
| 6,019,475 | A | 2/2000 | Lynam et al. | 6,140,933 | A | 10/2000 | Bugno et al. |
| 6,020,987 | A | 2/2000 | Baumann et al. | 6,142,656 | A | 11/2000 | Kurth |
| 6,021,371 | A | 2/2000 | Fultz | 6,146,003 | A | 11/2000 | Thau |
| 6,023,229 | A | 2/2000 | Bugno et al. | 6,147,934 | A | 11/2000 | Arikawa et al. |
| 6,025,872 | A | 2/2000 | Ozaki et al. | 6,148,261 | A | 11/2000 | Obradovich et al. |
| 6,028,537 | A | 2/2000 | Suman et al. | 6,149,287 | A | 11/2000 | Pastrick et al. |
| 6,037,689 | A | 3/2000 | Bingle et al. | 6,150,014 | A | 11/2000 | Chu et al. |
| 6,040,939 | A | 3/2000 | Demiryont et al. | 6,151,065 | A | 11/2000 | Steed et al. |
| 6,042,253 | A | 3/2000 | Fant, Jr. et al. | 6,151,539 | A | 11/2000 | Bergholz et al. |
| 6,042,934 | A | 3/2000 | Guiselin et al. | 6,152,551 | A | 11/2000 | Annas |
| 6,045,243 | A | 4/2000 | Muth et al. | 6,152,590 | A | 11/2000 | Fürst et al. |
| 6,045,643 | A | 4/2000 | Byker et al. | 6,154,149 | A | 11/2000 | Tyckowski et al. |
| 6,046,766 | A | 4/2000 | Sakata | 6,154,306 | A | 11/2000 | Varaprasad et al. |
| 6,046,837 | A | 4/2000 | Yamamoto | 6,157,294 | A | 12/2000 | Urai et al. |
| 6,049,171 | A | 4/2000 | Stam et al. | 6,157,418 | A | 12/2000 | Rosen |
| D425,466 | S | 5/2000 | Todd et al. | 6,157,424 | A | 12/2000 | Eichenlaub |
| 6,060,989 | A | 5/2000 | Gehlot | 6,157,480 | A | 12/2000 | Anderson et al. |
| 6,061,002 | A | 5/2000 | Weber et al. | 6,158,655 | A | 12/2000 | DeVries, Jr. et al. |
| 6,062,920 | A | 5/2000 | Jordan et al. | 6,161,865 | A | 12/2000 | Rose et al. |
| 6,064,508 | A | 5/2000 | Forgette et al. | 6,164,564 | A | 12/2000 | Franco et al. |
| 6,065,840 | A | 5/2000 | Caskey et al. | 6,166,625 | A | 12/2000 | Teowee et al. |
| 6,066,920 | A | 5/2000 | Torihara et al. | 6,166,629 | A | 12/2000 | Hamma et al. |
| 6,067,111 | A | 5/2000 | Hahn et al. | 6,166,698 | A | 12/2000 | Turnbull et al. |
| 6,067,500 | A | 5/2000 | Morimoto et al. | 6,166,834 | A | 12/2000 | Taketomi et al. |
| 6,068,380 | A | 5/2000 | Lynn et al. | 6,166,847 | A | 12/2000 | Tench et al. |
| D426,506 | S | 6/2000 | Todd et al. | 6,166,848 | A | 12/2000 | Cammenga et al. |
| D426,507 | S | 6/2000 | Todd et al. | 6,167,255 | A | 12/2000 | Kennedy, III et al. |

| | | |
|---|---|---|
| 6,167,755 B1 | 1/2001 | Damson et al. |
| 6,169,955 B1 | 1/2001 | Fultz |
| 6,170,956 B1 | 1/2001 | Rumsey et al. |
| 6,172,600 B1 | 1/2001 | Kakinama et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 | 3/2001 | Walker et al. |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,460 B1 | 4/2001 | DeLine et al. |
| 6,222,477 B1 | 4/2001 | Schofield et al. |
| 6,222,689 B1 | 4/2001 | Higuchi et al. |
| 6,227,689 B1 | 5/2001 | Miller |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 | 6/2001 | DeLine et al. |
| 6,244,716 B1 | 6/2001 | Steenwyk et al. |
| 6,245,262 B1 | 6/2001 | Varaprasad et al. |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,831 B1 | 7/2001 | Bauer et al. |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Ragan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B1 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B1 | 5/2002 | Knox |
| 6,390,635 B2 | 5/2002 | Whitehead et al. |
| 6,396,307 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |

| | | |
|---|---|---|
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,462,795 B1 | 10/2002 | Clarke |
| 6,463,369 B2 | 10/2002 | Sadano et al. |
| 6,465,963 B1 | 10/2002 | Turnbull et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,378 B2 | 2/2003 | Drummond et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chautorash |
| 6,543,163 B1 | 4/2003 | Ginsberg |
| 6,545,598 B1 | 4/2003 | de Villeroche |
| 6,547,133 B1 | 4/2003 | DeVries et al. |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,553,308 B1 | 4/2003 | Uhlmann et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takahashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | Deline et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,657,708 B1 | 12/2003 | Bechtel et al. |
| 6,661,482 B2 | 12/2003 | Hara |
| 6,661,830 B1 | 12/2003 | Reed et al. |
| 6,665,592 B2 | 12/2003 | Kodama |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsburg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,709,136 B2 | 3/2004 | Pastrick et al. |
| 6,713,783 B1 | 3/2004 | Mase et al. |

| | | |
|---|---|---|
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Droulliard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,742,905 B2 | 6/2004 | Suyama et al. |
| 6,744,353 B2 | 6/2004 | Sjönell |
| 6,746,127 B2 | 6/2004 | Suyama |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,907 B1 | 11/2004 | Gennetten et al. |
| 6,819,231 B2 | 11/2004 | Berberich et al. |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,861,789 B1 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,902,284 B2 | 6/2005 | Hutzel et al. |
| 6,904,348 B2 | 6/2005 | Drummond et al. |
| 6,906,632 B2 | 6/2005 | DeLine et al. |
| 6,909,361 B2 | 6/2005 | McCarthy et al. |
| 6,909,486 B2 | 6/2005 | Wang et al. |
| 6,910,779 B2 | 6/2005 | Abel et al. |
| 6,912,396 B2 | 6/2005 | Sziraki et al. |
| 6,916,099 B2 | 7/2005 | Su et al. |
| 6,922,902 B2 | 8/2005 | Schierbeek et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,934,067 B2 | 8/2005 | Ash et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,961,178 B2 | 11/2005 | Sugino et al. |
| 6,963,438 B2 | 11/2005 | Busscher et al. |
| 6,968,973 B2 | 11/2005 | Ockerse et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,992,718 B1 | 1/2006 | Takahara |
| 7,001,058 B2 | 2/2006 | Inditsky |
| 7,004,592 B2 | 2/2006 | Varaprasad et al. |
| 7,004,593 B2 | 2/2006 | Weller et al. |
| 7,006,173 B1 | 2/2006 | Hiyama et al. |
| 7,009,751 B2 | 3/2006 | Tonar et al. |
| 7,012,543 B2 | 3/2006 | DeLine et al. |
| 7,029,156 B2 | 4/2006 | Suehiro et al. |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,681 B2 | 6/2006 | Hinata et al. |
| 7,063,893 B2 | 6/2006 | Hoffman |
| 7,064,882 B2 | 6/2006 | Tonar et al. |
| 7,074,486 B2 | 7/2006 | Boire et al. |
| 7,081,810 B2 | 7/2006 | Henderson et al. |
| 7,092,052 B2 | 8/2006 | Okamoto et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,114,554 B2 | 10/2006 | Bergman et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,224,324 B2 | 5/2007 | Quist et al. |
| 7,227,472 B1 | 6/2007 | Roe |

| | | | | | |
|---|---|---|---|---|---|
| 7,230,523 B2 | 6/2007 | Harter, Jr. et al. | 7,455,412 B2 | 11/2008 | Rottcher |
| 7,232,231 B2 | 6/2007 | Shih | 7,460,007 B2 | 12/2008 | Schofield et al. |
| 7,233,304 B1 | 6/2007 | Aratani et al. | 7,467,883 B2 | 12/2008 | DeLine et al. |
| 7,235,918 B2 | 6/2007 | McCullough et al. | 7,468,651 B2 | 12/2008 | DeLine et al. |
| 7,241,030 B2 | 7/2007 | Mok et al. | 7,471,438 B2 | 12/2008 | McCabe et al. |
| 7,241,037 B2 | 7/2007 | Mathieu et al. | 7,474,963 B2 | 1/2009 | Taylor et al. |
| 7,245,207 B1 | 7/2007 | Dayan et al. | 7,477,439 B2 | 1/2009 | Tonar et al. |
| 7,245,231 B2 | 7/2007 | Kiefer et al. | 7,480,149 B2 | 1/2009 | DeWard et al. |
| 7,245,336 B2 | 7/2007 | Hiyama et al. | 7,488,080 B2 | 2/2009 | Skiver et al. |
| 7,248,305 B2 | 7/2007 | Ootsuta et al. | 7,488,099 B2 | 2/2009 | Fogg et al. |
| 7,251,079 B2 | 7/2007 | Capaldo et al. | 7,489,374 B2 | 2/2009 | Utsumi et al. |
| 7,255,451 B2 | 8/2007 | McCabe et al. | 7,490,007 B2 | 2/2009 | Taylor et al. |
| 7,255,465 B2 | 8/2007 | DeLine et al. | 7,490,943 B2 | 2/2009 | Kikuchi et al. |
| 7,259,036 B2 | 8/2007 | Borland et al. | 7,490,944 B2 | 2/2009 | Blank et al. |
| 7,262,406 B2 | 8/2007 | Heslin et al. | 7,494,231 B2 | 2/2009 | Varaprasad et al. |
| 7,262,916 B2 | 8/2007 | Kao et al. | 7,495,719 B2 | 2/2009 | Adachi et al. |
| 7,265,342 B2 | 9/2007 | Heslin et al. | 7,496,439 B2 | 2/2009 | McCormick |
| 7,268,841 B2 | 9/2007 | Kasajima et al. | 7,502,156 B2 | 3/2009 | Tonar et al. |
| 7,269,327 B2 | 9/2007 | Tang | 7,505,188 B2 | 3/2009 | Niiyama et al. |
| 7,269,328 B2 | 9/2007 | Tang | 7,511,607 B2 | 3/2009 | Hubbard et al. |
| 7,271,951 B2 | 9/2007 | Weber et al. | 7,511,872 B2 | 3/2009 | Tonar et al. |
| 7,274,501 B2 | 9/2007 | McCabe et al. | 7,525,715 B2 | 4/2009 | McCabe et al. |
| 7,281,491 B2 | 10/2007 | Iwamaru | 7,526,103 B2 | 4/2009 | Schofield et al. |
| 7,286,280 B2 | 10/2007 | Whitehead et al. | 7,533,998 B2 | 5/2009 | Schofield et al. |
| 7,287,868 B2 | 10/2007 | Carter et al. | 7,538,316 B2 | 5/2009 | Heslin et al. |
| 7,289,037 B2 | 10/2007 | Uken et al. | 7,540,620 B2 | 6/2009 | Weller et al. |
| 7,290,919 B2 | 11/2007 | Pan et al. | 7,541,570 B2 | 6/2009 | Drummond et al. |
| 7,292,208 B1 | 11/2007 | Park et al. | 7,542,193 B2 | 6/2009 | McCabe et al. |
| 7,300,183 B2 | 11/2007 | Kiyomoto et al. | 7,543,947 B2 | 6/2009 | Varaprasad et al. |
| 7,302,344 B2 | 11/2007 | Olney et al. | 7,547,467 B2 | 6/2009 | Olson et al. |
| 7,308,341 B2 | 12/2007 | Schofield et al. | 7,548,291 B2 | 6/2009 | Lee et al. |
| 7,310,177 B2 | 12/2007 | McCabe et al. | 7,551,354 B2 | 6/2009 | Horsten et al. |
| 7,311,428 B2 | 12/2007 | DeLine et al. | 7,561,181 B2 | 7/2009 | Schofield et al. |
| 7,316,485 B2 | 1/2008 | Roose | 7,562,985 B2 | 7/2009 | Cortenraad et al. |
| 7,317,386 B2 | 1/2008 | Lengning et al. | 7,567,291 B2 | 7/2009 | Bechtel et al. |
| 7,318,664 B2 | 1/2008 | Hatanaka et al. | 7,571,038 B2 | 8/2009 | Butler et al. |
| 7,323,819 B2 | 1/2008 | Hong et al. | 7,571,042 B2 | 8/2009 | Taylor et al. |
| 7,324,043 B2 | 1/2008 | Purden et al. | 7,572,490 B2 | 8/2009 | Park et al. |
| 7,324,172 B2 | 1/2008 | Yamazaki et al. | 7,579,939 B2 | 8/2009 | Schofield et al. |
| 7,324,174 B2 | 1/2008 | Hafuka et al. | 7,579,940 B2 | 8/2009 | Schofield et al. |
| 7,324,261 B2 | 1/2008 | Tonar et al. | 7,580,795 B2 | 8/2009 | McCarthy et al. |
| 7,327,225 B2 | 2/2008 | Nicholas et al. | 7,581,859 B2 | 9/2009 | Lynam |
| 7,327,226 B2 | 2/2008 | Turnbull et al. | 7,581,867 B2 | 9/2009 | Lee et al. |
| 7,327,855 B1 | 2/2008 | Chen | 7,583,184 B2 | 9/2009 | Schofield et al. |
| 7,328,103 B2 | 2/2008 | McCarthy et al. | 7,583,204 B2 | 9/2009 | McCarthy et al. |
| 7,329,013 B2 | 2/2008 | Blank et al. | 7,586,566 B2 | 9/2009 | Nelson et al. |
| 7,329,850 B2 | 2/2008 | Drummond et al. | 7,586,666 B2 | 9/2009 | McCabe et al. |
| 7,331,415 B2 | 2/2008 | Hawes et al. | 7,589,893 B2 | 9/2009 | Rottcher |
| 7,338,177 B2 | 3/2008 | Lynam | 7,600,878 B2 | 10/2009 | Blank et al. |
| 7,344,284 B2 | 3/2008 | Lynam et al. | 7,605,883 B2 | 10/2009 | Yamaki et al. |
| 7,349,143 B2 | 3/2008 | Tonar et al. | 7,619,508 B2 | 11/2009 | Lynam et al. |
| 7,349,582 B2 | 3/2008 | Takeda et al. | 7,623,202 B2 | 11/2009 | Araki et al. |
| 7,355,524 B2 | 4/2008 | Schofield | 7,626,749 B2 | 12/2009 | Baur et al. |
| 7,360,932 B2 | 4/2008 | Uken et al. | 7,633,567 B2 | 12/2009 | Yamada et al. |
| 7,362,505 B2 | 4/2008 | Hikmet et al. | 7,636,188 B2 | 12/2009 | Baur et al. |
| 7,368,714 B2 | 5/2008 | Remillard et al. | 7,636,195 B2 | 12/2009 | Nieuwkerk et al. |
| 7,370,983 B2 | 5/2008 | DeWind et al. | 7,636,930 B2 | 12/2009 | Chang |
| 7,372,611 B2 | 5/2008 | Tonar et al. | 7,643,200 B2 | 1/2010 | Varaprasad et al. |
| 7,375,895 B2 | 5/2008 | Brynielsson | 7,643,927 B2 | 1/2010 | Hils |
| 7,379,224 B2 | 5/2008 | Tonar et al. | 7,651,228 B2 | 1/2010 | Skiver et al. |
| 7,379,225 B2 | 5/2008 | Tonar et al. | 7,658,521 B2 | 2/2010 | DeLine et al. |
| 7,379,243 B2 | 5/2008 | Horsten et al. | 7,663,798 B2 | 2/2010 | Tonar et al. |
| 7,379,814 B2 | 5/2008 | Ockerse et al. | 7,667,579 B2 | 2/2010 | DeLine et al. |
| 7,379,817 B1 | 5/2008 | Tyson et al. | 7,670,016 B2 | 3/2010 | Weller et al. |
| 7,380,633 B2 | 6/2008 | Shen et al. | 7,688,495 B2 | 3/2010 | Tonar et al. |
| 7,382,389 B2 | 6/2008 | McCarthy et al. | 7,695,174 B2 | 4/2010 | Takayanagi et al. |
| 7,389,171 B2 | 6/2008 | Rupp | 7,696,964 B2 | 4/2010 | Lankhorst et al. |
| 7,391,563 B2 | 6/2008 | McCabe et al. | 7,706,046 B2 | 4/2010 | Bauer et al. |
| 7,396,147 B2 | 7/2008 | Munro | 7,710,631 B2 | 5/2010 | McCabe et al. |
| 7,411,732 B2 | 8/2008 | Kao et al. | 7,711,479 B2 | 5/2010 | Taylor et al. |
| 7,412,328 B2 | 8/2008 | Uhlmann et al. | 7,726,822 B2 | 6/2010 | Blank et al. |
| 7,417,781 B2 | 8/2008 | Tonar et al. | 7,728,276 B2 | 6/2010 | Drummond et al. |
| 7,420,159 B2 | 9/2008 | Heslin et al. | 7,728,721 B2 | 6/2010 | Schofield et al. |
| 7,446,462 B2 | 11/2008 | Lim et al. | 7,728,927 B2 | 6/2010 | Nieuwkerk et al. |
| 7,446,650 B2 | 11/2008 | Schofield et al. | 7,734,392 B2 | 6/2010 | Schofield et al. |
| 7,446,924 B2 | 11/2008 | Schofield et al. | 7,746,534 B2 | 6/2010 | Tonar et al. |
| 7,448,776 B2 | 11/2008 | Tang | 7,787,077 B2 | 8/2010 | Kondoh et al. |
| 7,452,090 B2 | 11/2008 | Weller et al. | 7,791,694 B2 | 9/2010 | Molsen et al. |
| 7,453,057 B2 | 11/2008 | Drummond et al. | 7,795,675 B2 | 9/2010 | Darwish et al. |

| | | |
|---|---|---|
| 7,830,583 B2 | 11/2010 | Neuman et al. |
| 7,842,154 B2 | 11/2010 | Lynam |
| 7,871,169 B2 | 1/2011 | Varaprasad et al. |
| 2001/0019356 A1 | 9/2001 | Takeda et al. |
| 2001/0022616 A1 | 9/2001 | Rademacher et al. |
| 2001/0026215 A1 | 10/2001 | Nakaho et al. |
| 2001/0026316 A1 | 10/2001 | Senatore |
| 2001/0030857 A1 | 10/2001 | Futhey et al. |
| 2001/0035853 A1 | 11/2001 | Hoelen et al. |
| 2001/0045981 A1 | 11/2001 | Gloger et al. |
| 2002/0036828 A1 | 3/2002 | Wong |
| 2002/0044065 A1 | 4/2002 | Quist et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2002/0159270 A1 | 10/2002 | Lynam et al. |
| 2002/0190120 A1 | 12/2002 | Pentel |
| 2002/0196639 A1 | 12/2002 | Weidel |
| 2003/0002165 A1 | 1/2003 | Mathias et al. |
| 2003/0002179 A1 | 1/2003 | Roberts et al. |
| 2003/0007261 A1 | 1/2003 | Hutzel et al. |
| 2003/0016287 A1 | 1/2003 | Nakayama et al. |
| 2003/0016543 A1 | 1/2003 | Pastrick et al. |
| 2003/0020603 A1 | 1/2003 | DeLine et al. |
| 2003/0025596 A1 | 2/2003 | Lang et al. |
| 2003/0030546 A1 | 2/2003 | Tseng |
| 2003/0030724 A1 | 2/2003 | Okamoto |
| 2003/0035050 A1 | 2/2003 | Mizusawa et al. |
| 2003/0043269 A1 | 3/2003 | Park |
| 2003/0043589 A1 | 3/2003 | Blank |
| 2003/0048639 A1 | 3/2003 | Boyd et al. |
| 2003/0052969 A1 | 3/2003 | Satoh et al. |
| 2003/0058338 A1 | 3/2003 | Kawauchi et al. |
| 2003/0069690 A1 | 4/2003 | Correia et al. |
| 2003/0080877 A1 | 5/2003 | Takagi et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0095331 A1 | 5/2003 | Bengoechea et al. |
| 2003/0098908 A1 | 5/2003 | Misaiji et al. |
| 2003/0101749 A1 | 6/2003 | Lingle et al. |
| 2003/0103142 A1 | 6/2003 | Hitomi et al. |
| 2003/0117522 A1 | 6/2003 | Okada |
| 2003/0122929 A1 | 7/2003 | Minuado et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0191583 A1 | 10/2003 | Uhlmann et al. |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0032655 A1 | 2/2004 | Kikuchi et al. |
| 2004/0032676 A1 | 2/2004 | Drummond et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0105614 A1 | 6/2004 | Kobayashi et al. |
| 2004/0107030 A1 | 6/2004 | Nishira et al. |
| 2004/0109060 A1 | 6/2004 | Ishii |
| 2004/0114039 A1 | 6/2004 | Ishikura |
| 2004/0145457 A1 | 7/2004 | Schofield et al. |
| 2004/0148102 A1 | 7/2004 | McCarthy et al. |
| 2004/0160313 A1 | 8/2004 | McCarthy et al. |
| 2004/0170008 A1 | 9/2004 | Tenmyo |
| 2004/0202001 A1 | 10/2004 | Roberts et al. |
| 2004/0239243 A1 | 12/2004 | Roberts et al. |
| 2004/0239849 A1 | 12/2004 | Wang |
| 2004/0243303 A1 | 12/2004 | Padmanabhan |
| 2004/0264011 A1 | 12/2004 | Lynam |
| 2005/0018738 A1 | 1/2005 | Duan et al. |
| 2005/0024591 A1 | 2/2005 | Lian et al. |
| 2005/0024729 A1 | 2/2005 | Ockerse et al. |
| 2005/0078389 A1 | 4/2005 | Kulas et al. |
| 2005/0079326 A1 | 4/2005 | Varaprasad et al. |
| 2005/0099559 A1 | 5/2005 | Lee et al. |
| 2005/0099693 A1 | 5/2005 | Schofield et al. |
| 2005/0111070 A1 | 5/2005 | Lin et al. |
| 2005/0117095 A1 | 6/2005 | Ma |
| 2005/0134983 A1 | 6/2005 | Lynam |
| 2005/0140855 A1 | 6/2005 | Utsumi et al. |
| 2005/0168995 A1 | 8/2005 | Kittelmann et al. |
| 2005/0169003 A1 | 8/2005 | Lindahl et al. |
| 2005/0172504 A1 | 8/2005 | Ohm et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0164230 A1 | 7/2006 | DeWind et al. |
| 2006/0171704 A1 | 8/2006 | Bingle et al. |
| 2006/0187378 A1 | 8/2006 | Bong et al. |
| 2006/0274218 A1 | 12/2006 | Xue |
| 2006/0279522 A1 | 12/2006 | Kurihara |
| 2007/0041096 A1 | 2/2007 | Nieuwkerk et al. |
| 2007/0058257 A1 | 3/2007 | Lynam |
| 2007/0064108 A1 | 3/2007 | Haler |
| 2007/0080585 A1 | 4/2007 | Lyu |
| 2007/0118287 A1 | 5/2007 | Taylor et al. |
| 2007/0183037 A1 | 8/2007 | De Boer et al. |
| 2007/0183066 A1 | 8/2007 | Varaprasad et al. |
| 2007/0184284 A1 | 8/2007 | Varaprasad et al. |
| 2007/0201122 A1 | 8/2007 | Dozeman et al. |
| 2007/0262732 A1 | 11/2007 | Shen |
| 2008/0002106 A1 | 1/2008 | Van De Witte et al. |
| 2008/0030311 A1 | 2/2008 | Dayan et al. |
| 2008/0068520 A1 | 3/2008 | Minikey, Jr. et al. |
| 2008/0077882 A1 | 3/2008 | Kramer et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0212189 A1 | 9/2008 | Baur et al. |
| 2008/0225538 A1 | 9/2008 | Lynam et al. |
| 2008/0231704 A1 | 9/2008 | Schofield et al. |
| 2008/0266389 A1 | 10/2008 | DeWind et al. |
| 2008/0291522 A1 | 11/2008 | Varaprasad et al. |
| 2009/0002491 A1 | 1/2009 | Haler |
| 2009/0015736 A1 | 1/2009 | Weller et al. |
| 2009/0033837 A1 | 2/2009 | Molsen et al. |
| 2009/0040465 A1 | 2/2009 | Conner et al. |
| 2009/0040588 A1 | 2/2009 | Tonar et al. |
| 2009/0040778 A1 | 2/2009 | Takayanagi et al. |
| 2009/0052003 A1 | 2/2009 | Schofield et al. |
| 2009/0067032 A1 | 3/2009 | Varaprasad et al. |
| 2009/0080055 A1 | 3/2009 | Baur et al. |
| 2009/0085729 A1 | 4/2009 | Nakamura et al. |
| 2009/0096937 A1 | 4/2009 | Bauer et al. |

| | | | | | | |
|---|---|---|---|---|---|---|
| 2009/0141331 A1 | 6/2009 | Skiver et al. | EP | 1315639 | | 2/2006 |
| 2009/0174776 A1 | 7/2009 | Taylor et al. | FR | 1021987 | A | 2/1953 |
| 2009/0184904 A1 | 7/2009 | S. et al. | FR | 1461419 | | 12/1966 |
| 2009/0201137 A1 | 8/2009 | Weller et al. | FR | 2585991 | | 2/1987 |
| 2009/0219394 A1 | 9/2009 | Heslin et al. | FR | 2672857 | A1 | 8/1992 |
| 2009/0231741 A1 | 9/2009 | Weller et al. | FR | 2673499 | A1 | 9/1992 |
| 2009/0237820 A1 | 9/2009 | McCabe et al. | FR | 2759045 | | 8/1998 |
| 2009/0243824 A1 | 10/2009 | Hook et al. | GB | 810010 | | 3/1959 |
| 2009/0244740 A1 | 10/2009 | Takayanagi et al. | GB | 934037 | | 8/1963 |
| 2009/0262192 A1 | 10/2009 | Schofield et al. | GB | 1008411 | | 10/1965 |
| 2009/0262422 A1 | 10/2009 | Cross et al. | GB | 1136134 | | 12/1968 |
| 2009/0290369 A1 | 11/2009 | Schofield et al. | GB | 1553376 | | 9/1979 |
| 2009/0296190 A1 | 12/2009 | Anderson et al. | GB | 2137573 | A | 10/1984 |
| 2010/0033797 A1 | 2/2010 | Schofield et al. | GB | 2161440 | | 1/1986 |
| 2010/0045790 A1 | 2/2010 | Lynam et al. | GB | 2192370 | | 1/1988 |
| 2010/0045899 A1 | 2/2010 | Ockerse | GB | 2222991 | | 3/1990 |
| 2010/0046059 A1 | 2/2010 | McCabe et al. | GB | 2255539 | A | 11/1992 |
| 2010/0053723 A1 | 3/2010 | Varaprasad et al. | GB | 2351055 | A | 12/2000 |
| 2010/0085645 A1 | 4/2010 | Skiver et al. | GB | 2362494 | | 11/2001 |
| 2010/0091509 A1 | 4/2010 | Deline et al. | JP | 50-000638 | A | 1/1975 |
| 2010/0110523 A1 | 5/2010 | Varaprasad et al. | JP | 52-146988 | | 11/1977 |
| 2010/0110553 A1 | 5/2010 | Anderson et al. | JP | 55-039843 | | 3/1980 |
| 2010/0117815 A1 | 5/2010 | Deline et al. | JP | 57-30639 | | 2/1982 |
| 2010/0126030 A1 | 5/2010 | Weller et al. | JP | 57-208530 | | 12/1982 |
| 2010/0165437 A1 | 7/2010 | Tonar et al. | JP | 58-030729 | | 2/1983 |
| 2010/0172008 A1 | 7/2010 | McCabe et al. | JP | 58020954 | | 2/1983 |
| 2010/0174485 A1 | 7/2010 | Taylor et al. | JP | 58-110334 | | 6/1983 |
| 2010/0194890 A1 | 8/2010 | Weller et al. | JP | 58-180347 | | 10/1983 |
| 2010/0195226 A1 | 8/2010 | Heslin et al. | JP | 58-209635 | | 12/1983 |
| 2010/0201896 A1 | 8/2010 | Ostreko et al. | JP | 59-114139 | | 7/1984 |
| 2010/0202075 A1 | 8/2010 | Blank et al. | JP | 60-212730 | | 10/1985 |
| 2010/0207013 A1 | 8/2010 | Drummond et al. | JP | 60-261275 | | 12/1985 |
| 2010/0214662 A1 | 8/2010 | Takayanagi et al. | JP | 61127186 | | 6/1986 |
| 2010/0219985 A1 | 9/2010 | Schofield et al. | JP | 61-260217 | | 11/1986 |
| 2010/0222963 A1 | 9/2010 | Schofield et al. | JP | 62-043543 | | 2/1987 |
| 2010/0245701 A1 | 9/2010 | Sato et al. | JP | 62-075619 | | 4/1987 |
| 2010/0246017 A1 | 9/2010 | Tonar et al. | JP | 62-122487 | | 6/1987 |
| 2010/0277786 A1 | 11/2010 | Anderson et al. | JP | 62131232 | | 6/1987 |
| 2010/0289995 A1 | 11/2010 | Hwang et al. | JP | 63-02753 | | 1/1988 |
| 2011/0109746 A1 | 5/2011 | Schofield et al. | JP | 63085525 | | 4/1988 |
| 2011/0141543 A1 | 6/2011 | Uken et al. | JP | 63-106730 | | 5/1988 |
| | | | JP | 63-106731 | | 5/1988 |
| FOREIGN PATENT DOCUMENTS | | | JP | 63-274286 | | 11/1988 |
| DE | 941408 | 4/1956 | JP | 64-14700 | | 1/1989 |
| DE | 944531 | 7/1956 | JP | 01-123587 | | 5/1989 |
| DE | 7323996 | 11/1973 | JP | 01130578 | | 5/1989 |
| DE | 3248511 A1 | 7/1984 | JP | 02-122844 | | 10/1990 |
| DE | 3301945 | 7/1984 | JP | 03-28947 | | 3/1991 |
| DE | 3605704 | 8/1987 | JP | 03-052097 | | 3/1991 |
| DE | 3614882 | 11/1987 | JP | 30-061192 | | 3/1991 |
| DE | 3720848 | 1/1989 | JP | 328947 | | 3/1991 |
| DE | 9306989.8 U1 | 7/1993 | JP | 03-110855 | | 5/1991 |
| DE | 4329983 | 8/1995 | JP | 03198026 | | 8/1991 |
| DE | 4444443 A1 | 6/1996 | JP | 03-243914 | | 10/1991 |
| DE | 29703084 U1 | 6/1997 | JP | 04-114587 | | 4/1992 |
| DE | 29805142 U1 | 5/1998 | JP | 04-245886 | | 9/1992 |
| DE | 19741896 | 4/1999 | JP | 05080716 | | 4/1993 |
| DE | 19755008 | 7/1999 | JP | 05183194 | | 7/1993 |
| DE | 29902344 U1 | 7/1999 | JP | 05-213113 | | 8/1993 |
| DE | 19934999 | 2/2001 | JP | 05-257142 | | 10/1993 |
| DE | 19943355 | 3/2001 | JP | 60-80953 A | | 3/1994 |
| DE | 20118868 | 3/2002 | JP | 61-07035 A | | 4/1994 |
| DE | 10131459 | 1/2003 | JP | 62-27318 A | | 8/1994 |
| EP | 0299509 A2 | 1/1989 | JP | 06318734 | | 11/1994 |
| EP | 0513476 A1 | 11/1992 | JP | 07146467 | | 6/1995 |
| EP | 0524766 | 1/1993 | JP | 07-175035 | | 7/1995 |
| EP | 0729864 A1 | 12/1995 | JP | 07191311 | | 7/1995 |
| EP | 0728618 A2 | 8/1996 | JP | 07-266928 | | 10/1995 |
| EP | 0825477 | 2/1998 | JP | 07-277072 | | 10/1995 |
| EP | 0830985 | 3/1998 | JP | 07-281185 | | 10/1995 |
| EP | 0928723 A2 | 7/1999 | JP | 07267002 | | 10/1995 |
| EP | 937601 A2 | 8/1999 | JP | 07281150 | | 10/1995 |
| EP | 0979758 | 2/2000 | JP | 08-008083 | | 1/1996 |
| EP | 1075986 | 2/2001 | JP | 08-083581 | | 3/1996 |
| EP | 1097848 A | 5/2001 | JP | 08-216789 | | 8/1996 |
| EP | 1152285 A2 | 11/2001 | JP | 08227769 | | 9/1996 |
| EP | 1193773 | 3/2002 | JP | 09033886 | | 2/1997 |
| EP | 1256833 | 11/2002 | JP | 09-260074 | | 3/1997 |
| EP | 0899157 | 10/2004 | JP | 05-077657 | | 7/1997 |

| | | |
|---|---|---|
| JP | 09-220976 | 8/1997 |
| JP | 09230827 | 9/1997 |
| JP | 09-266078 | 10/1997 |
| JP | 09-288262 | 11/1997 |
| JP | 10-076880 | 3/1998 |
| JP | 10-199480 | 7/1998 |
| JP | 10190960 | 7/1998 |
| JP | 10-206643 | 8/1998 |
| JP | 10221692 | 8/1998 |
| JP | 10239659 | 9/1998 |
| JP | 10276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11131880 A | 5/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 01075898 A | 6/2001 |
| JP | 2001-222005 | 8/2001 |
| JP | 200272901 | 3/2002 |
| JP | 2002-120649 | 4/2002 |
| JP | 2002-122860 | 4/2002 |
| JP | 2002162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| JP | 2008083657 | 4/2008 |
| KR | 20060038856 | 5/2006 |
| KR | 100663930 | 1/2007 |
| WO | WO 82/02448 | 7/1982 |
| WO | WO8606179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO03078941 | 9/2003 |

OTHER PUBLICATIONS

Edgar, Julian; Goodbye 12 Volts . . . . Hello 42 Voltsl; Oct. 5, 1999; Autospeed 50; Issue 50; www.autospeed.co.nz./cms/A_0319/article.html.

Kobe, Gerry; 42 Volts Goes Underhood; Mar. 2000; Automotive Industries; Cahners Publishing Company; www.findarticies.com/p/articles/mi_m3012/is_3_180/ai_61361677.

Jewett, Dale; Aug. 2000; Automotive Industries; Cahners Publising Company; vvww.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

INTERIOR REARVIEW MIRROR SYSTEM

CROSS-REFERENCE TO RELATED APPLICATIONS

This application is a continuation of U.S. patent application Ser. No. 12/551,849, filed Sep. 1, 2009, now U.S. Pat. No. 7,916,043, which is a continuation of U.S. patent application Ser. No. 11/935,795, filed Nov. 6, 2007, now U.S. Pat. No. 7,583,204, which is a continuation of U.S. patent application Ser. No. 11/053,436, filed on Feb. 8, 2005, now U.S. Pat. No. 7,382,289, which is a continuation of U.S. patent application Ser. No. 10/777,812, filed on Feb. 12, 2004, now U.S. Pat. No. 6,909,361, which is a continuation of U.S. patent application Ser. No. 09/839,678, filed on Apr. 20, 2001, now U.S. Pat. No. 6,693,517, which claims priority from U.S. provisional application Ser. No. 60/199,676, filed on Apr. 21, 2000, the disclosures of which are hereby incorporated herein by reference in their entirety; and application Ser. No. 10/777,812 is a continuation-in-part of U.S. patent application Ser. No. 10/365,794, filed on Feb. 13, 2003, now U.S. Pat. No. 6,832,719, which is a continuation of U.S. patent application Ser. No. 09/687,778, filed Oct. 13, 2000, now U.S. Pat. No. 6,547,133, which is a continuation of U.S. patent application Ser. No. 09/057,428, filed Apr. 8, 1998, now U.S. Pat. No. 6,158,655; and application Ser. No. 10/777,812 is a continuation-in-part of U.S. patent application Ser. No. 10/755,627, filed on Jan. 12, 2004, now U.S. Pat. No. 7,158,881, which is a continuation of U.S. patent application Ser. No. 10/287,178, filed on Nov. 4, 2002, now U.S. Pat. No. 6,678,614, which is a continuation of U.S. patent application Ser. No. 09/799,414, filed on Mar. 5, 2001, now U.S. Pat. No. 6,477,464, which claims priority from U.S. provisional patent application Ser. No. 60/187,960, filed on Mar. 9, 2000; and the present application is a continuation-in-part of U.S. patent application Ser. No. 12/536,930, filed Aug. 6, 2009, which is a continuation of U.S. patent application Ser. No. 12/052,341, filed Mar. 20, 2008, now U.S. Pat. No. 7,579,940, which is a continuation of U.S. patent application. Ser. No. 11/625,374, filed Jan. 22, 2007, now U.S. Pat. No. 7,579,939, which is a continuation of U.S. patent application Ser. No. 10/755,915, filed Jan. 13, 2004, now U.S. Pat. No. 7,446,650, which is a continuation of U.S. application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000.

BACKGROUND OF THE INVENTION

This invention relates to data and information communication within an automobile and particularly to automotive mirror assemblies adapted to communicate wirelessly with other vehicular accessories and/or with personal accessories of occupants of the vehicle.

SUMMARY OF THE INVENTION

A vehicle may have features and/or accessories connected by a variety of wireless links and/or wired links, such as are described in commonly assigned U.S. Pat. No. 6,396,408, issued to Drummond et al., for a DIGITAL ELECTROCHROMIC CIRCUIT WITH A VEHICLE NETWORK, which claims priority from U.S. provisional patent application Ser. No. 60/196,577, filed on Mar. 31, 2000, by Lynam et al., for a DIGITAL ELECTROCHROMIC CIRCUIT WITH A VEHICLE NETWORK SUCH AS A CAR AREA NETWORK OR A LOCAL INTERCONNECT NETWORK, and U.S. Pat. No. 6,294,989, issued to Schofield et al., for a TIRE INFLATION ASSISTANCE MONITORING SYSTEM, the disclosures of which are hereby incorporated herein by reference. For example, some vehicle features, accessories and functions can be interconnected by and/or can communicate by wire connection, by wireless infrared communication, wireless microwave communication, by wireless RF communication, or by any combination of the above.

As described also in commonly assigned U.S. Pat. No. 6,690,268 issued to Schofield et al., for VIDEO MIRROR SYSTEMS INCORPORATING AN ACCESSORY MODULE, which relates to U.S. provisional application Ser. No. 60/263,680, filed on Jan. 23, 2001, by Lynam et al., entitled VIDEO MIRROR SYSTEMS INCORPORATING AN ACCESSORY MODULE, U.S. provisional application Ser. No. 60/243,986, filed on Oct. 27, 2000, by Lynam et al., entitled VIDEO MIRROR SYSTEMS INCORPORATING AN ACCESSORY MODULE, U.S. provisional application Ser. No. 60/238,483, filed on Oct. 6, 2000, by Lynam et al., entitled VIDEO MIRROR SYSTEMS, U.S. provisional application Ser. No. 60/237,077, filed on Sep. 30, 2000, by Lynam et al., entitled VIDEO MIRROR SYSTEMS, U.S. provisional application Ser. No. 60/234,412, filed on Sep. 21, 2000, by Lynam et al., entitled VIDEO MIRROR SYSTEMS, U.S. provisional application Ser. No. 60/218,336, filed on Jul. 14, 2000, by Lynam et al., entitled INTERIOR REARVIEW MIRROR ASSEMBLY INCORPORATING A VIDEO SCREEN, and U.S. provisional patent application Ser. No. 60/186,520, filed on Mar. 2, 2000, by Lynam et al., for an INTERIOR REARVIEW MIRROR ASSEMBLY INCORPORATING A VIDEO SCREEN, and in commonly assigned U.S. Pat. Nos. 6,000,823 and 5,959,367, all of the disclosures of which are hereby incorporated herein by reference, the vehicle and particularly the interior/exterior mirror assembly can host a variety of features and accessories. Also, such features and accessories can be connected via cable elements, such as coaxial cable, a multi-ribbon cable, a multiwire cable, and/or a fiber-optic cable (for communicating by optical method), or can be connected without wires, such as by short range RF wireless communication such as provided by Motorola, Schaumberg, Ill. via their BLUETOOTH protocol or by infrared wireless communication such as provided via the IrDA protocol available from Clarinet System Inc. of San Jose, Calif.

The present invention is particularly suitable for use in a "connected car," i.e., an automobile in two-way communication with a remote party such as by a telematic wireless communication link, and most preferably, connected to an information source such as the WorldWide WEB via the INTERNET. This present invention provides compatibility and interoperability for mobile devices, such as hand-held mobile phones, personal digital assistants (PDA) such as a PalmPilot PDA, hand-held personal identifiers, hand-held remote entry devices, such as a key fob as known in the automotive arts including active and passive entry key fobs, and the like.

Accessories may be provided at the purchase of the vehicle as in-vehicle installed items or may be carried in and out of the vehicle by the user. Such can be provided with ports or interfaces adapted to communicate via the use of a cable or wired communication, but more preferably a wireless communication. For example, a modular phone may be equipped with an RF communication link operating under a short-range wireless communication protocol, such as BLUETOOTH available from Motorola of Schaumberg, Ill. that communicates with the vehicle wirelessly so that, for example, telephone communication can be conducted via the audio system of the vehicle while the occupant possessing the BLUETOOTH-equipped phone is using the phone. Likewise, a phone or other mobile device can be equipped with an infrared (IR) communication interface/port such as an IrDA port than can provide wireless infrared connectivity.

A vehicle mirror-based wireless communication system, according to an aspect of the invention, includes an interior rearview mirror assembly including an interior mirror reflective element, a housing for the reflective element, and a mirror-mounted communication device. The mirror-mounted communication device includes a communication data port for short-range communication with a mobile device that is a personal accessory of an occupant of the vehicle. The communication device further includes a telecommunication link from the vehicle to an external provider of information or service. In this manner, the communication device provides connectivity between a low-power mobile device and a provider of information or service separated from the vehicle.

A vehicle mirror-based wireless communication system, according to another aspect of the invention, includes an interior rearview mirror assembly including an interior mirror reflective element and a housing for the reflective element. A remote telematic server is provided that is remote from the vehicle. A vehicular dynamic interactive communication system is provided at the rearview mirror assembly. The communication system includes a Global Positioning System (GPS) for determining a geographic location of the vehicle and a first communication link with the remote telematic server. The mirror-based wireless communication system further includes at least one service provider and a second communication link between the at least one service provider and the telematic server. In this manner, the communication system communicates identification data to the telematic server pertaining to either the location, identity and/or direction heading of the vehicle. The at least one service provider provides assistance data to the vehicle via the first and second communication links. The assistance data is customized to the location identity and/or direction heading of the vehicle.

These and other objects, advantages and features of this invention will become apparent upon review of the following specification in conjunction with the drawings.

DESCRIPTION OF THE PREFERRED EMBODIMENT

Figure 1:
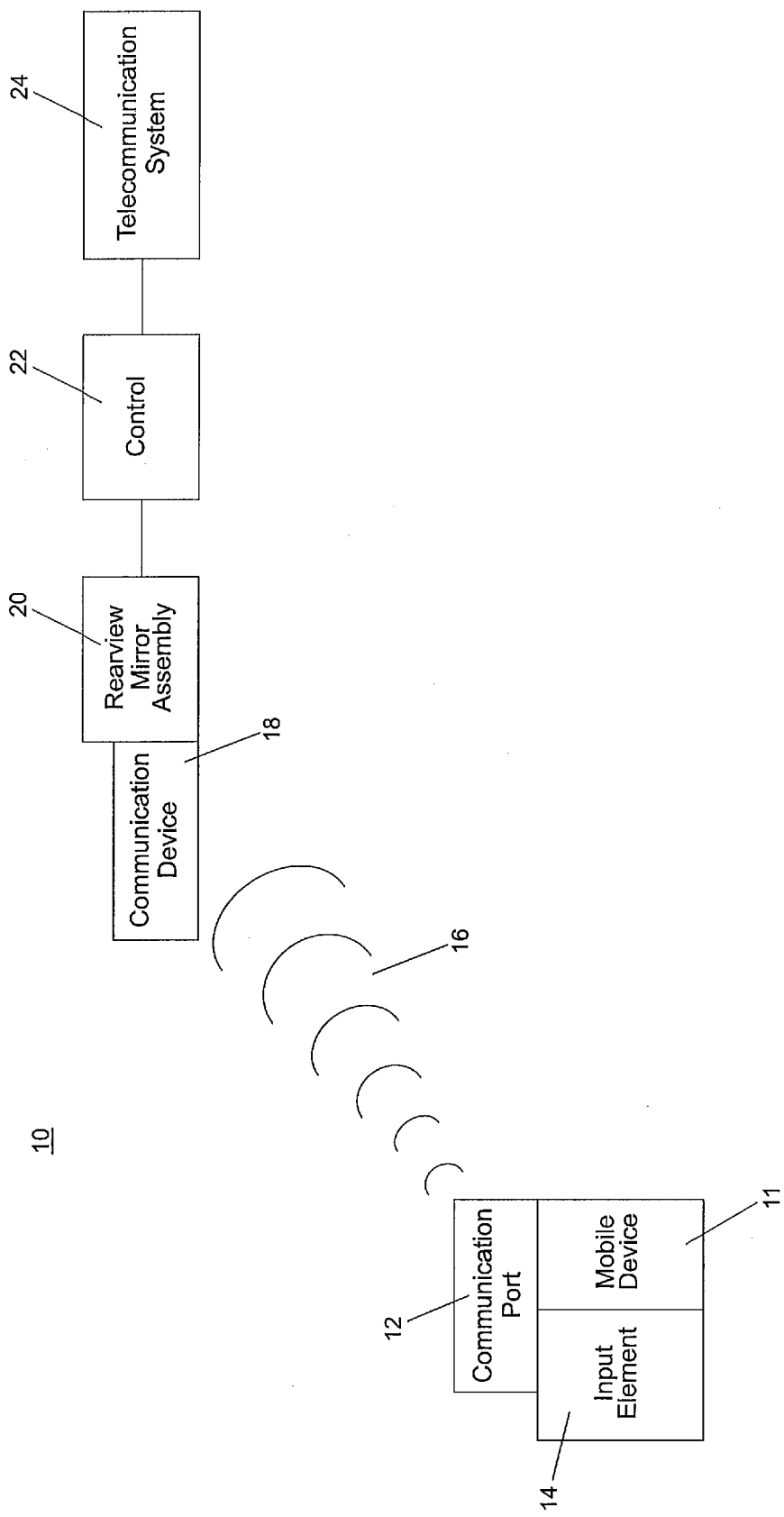
FIG. 1 is an electrical block diagram of a vehicle mirror-based wireless communication system, according to the invention.

In order for mobile devices to be used within the interior cabin of a vehicle, such as an automobile, the vehicle must be equipped with at least one complementary interface/port capable of wireless communication with the mobile device within the vehicle cabin, or when approaching the vehicle from the exterior. Where wireless infrared connectivity is used, it is preferred that line-of-sight communication be possible between the mobile device and the interface/port of the vehicle that serves as the interface and exchange point for data between the mobile device and the vehicle electronics system/accessories. In this regard, placement of an IR data port at the interior rearview mirror assembly (such as at or in the case/bezel of the assembly, or attached to the mirror assembly support about which the casing housing is adjustable, or at or in a pod attached to the attachment mount of the interior mirror assembly to the vehicle, such as to a mirror mounting button on a windshield as are known in the mirror arts) has the advantage of being high mounted and central, and so accessible to all vehicle occupants including those in both the front seats and in rear seats.

The interior rearview mirror of the vehicle (and optionally an exterior side view mirror of the vehicle) is preferably equipped with at least one infrared communication port such as an IrDA (Infrared Data Port) such as the devices available from by Clarinet Systems Inc., San Jose, Calif. for wireless connectivity to other IrDA devices such as the Personal Digital Assistants (PDA) like the Palm Pilot Palm III, Mx, V, VII, Glenarye pager, Motorola 2000× Pagewriter, and similar devices and cellular phones equipped with IrDA ports such as the Nokia 6210, Windows CE devices, laptop computers, and similar mobile devices having wireless communication capabilities to paging, cellular, or satellite systems. Also, by connecting a mobile device to the vehicle via a vehicle-mounted, preferably mirror-mounted, wireless connectivity interface/port, a low-feature and/or low-power mobile device can be linked to the vehicle, and the vehicle (including its on-board computer) can serve as the modem/communication port/computer for the mobile device, thus greatly expanding the capability of the mobile device. This enables wireless connectivity of devices that originally could not act as a wireless modem.

Also, mobile devices typically have restricted display capabilities. By connecting wirelessly to the vehicle and to the vehicle's electronics (such as a vehicle computer), the greater display capability and/or greater computing power of the vehicle (such as a vehicle video display, preferably minor-mounted, such as disclosed in commonly assigned U.S. Pat. No. 6,690,268 issued to Schofield et al., for VIDEO MIRROR SYSTEMS INCORPORATING AN ACCESSORY MODULE, which relates to U.S. provisional application Ser. No. 60/263,680, filed on Jan. 23, 2001, by Lynam et al., entitled VIDEO MIRROR SYSTEMS INCORPORATING AN ACCESSORY MODULE, U.S. provisional application Ser. No. 60/243,986, filed on Oct. 27, 2000, by Lynam et al., entitled VIDEO MIRROR SYSTEMS INCORPORATING AN ACCESSORY MODULE, U.S. provisional application Ser. No. 60/238,483, filed on Oct. 6, 2000, by Lynam et al., entitled VIDEO MIRROR SYSTEMS, U.S. provisional application Ser. No. 60/237,077, filed on Sep. 30, 2000, by Lynam et al., entitled VIDEO MIRROR SYSTEMS, U.S. provisional application Ser. No. 60/234,412, filed on Sep. 21, 2000, by Lynam et al., entitled VIDEO MIRROR SYSTEMS, U.S. provisional application Ser. No. 60/218,336, filed on Jul. 14, 2000, by Lynam et al., entitled INTERIOR REARVIEW MIRROR ASSEMBLY INCORPORATING A VIDEO SCREEN, and U.S. provisional patent application Ser. No. 60/186,520, filed Mar. 2, 2000, by Lynam et al., for an INTERIOR REARVIEW MIRROR ASSEMBLY INCORPORATING A VIDEO SCREEN, the disclosures of which are hereby incorporated herein by reference), can be accessed and used by the mobile device.

A separate display is located behind the mirror reflector. In such a configuration where a display element is behind the mirror reflector, the reflective mirror coating of the mirror reflective element can be locally at least partially removed at the location of the display element disposed behind the mirror element. Optionally, where all the reflective mirror coating is removed, a semitransparent but significantly reflecting coating or series of coatings (such as a thin metal film coating or a multilayer of coatings, including a thin metal coating of silver, aluminum, rhodium (or their alloys), or the like, or a dichroic coating or coating stack, can be used that substantially masks the display element from driver notice until the display element is powered to display information, such as disclosed in U.S. Pat. Nos. 5,668,663 and 5,724,187, which are incorporated by reference in their entireties. Such has been described as "display on demand" in the art. Such display can include a "display on demand" such as disclosed in U.S. Pat. Nos. 5,668,663 and 5,724,187 noted above. In this regard, it is preferable that the display be a light-emitting display, such as a fluorescent display, a vacuum fluorescent display, a field emission display, an electroluminescent display, a fluorescent display, a plasma display, or a light-emitting diode display, such as an organic or inorganic light-emitting diode display. Alternatively, the reflective element may comprise a substantially reflecting, significantly light-transmitting reflective element, such as disclosed in U.S. Pat. Nos. 5,668,663 and 5,724,187 noted above. An example, such as a semitransparent reflector, would be a third surface reflector coated on the third surface of an electrochromic mirror element, as known in the electrochromic mirror art, consisting of a thin metal coating (such as of silver, silver alloy, aluminum, aluminum alloy) that is significantly reflecting of at least 60%, preferably at least 70% and most preferably at least 75% but also significantly transmitting in the range of between 5% to 30%, preferably in the range of between 10% and 25% and most preferably in the range of between 15% and 20%. Preferably, the thin metal coating is overcoated with a transparent conductor such as indium tin oxide when contacting an electrochromic medium (preferably an electrochromic solid polymer film) when serving as a combined third surface reflector/conductor layer in an electrochromic laminate cell construction. For further details of suitable reflective elements with portions of the reflective mirror coating adapted to permit light to transmit through the reflective element or of a highly reflecting/significantly transflective reflective element, reference is made to U.S. Pat. Nos. 5,668,663 and 5,724,187.

This access can be facilitated via protocols such as the Wireless Application Protocol (WAP) for mobile devices and can be networked via sub-networks of the WorldWideWeb by systems providers such as JP Systems Inc. of Dallas, Tex. Such networks are designed for mobile devices and include client applications, gateways, and backend servers integrating with open standards, such as WAP. The server compresses and optimizes data so that it can be sent to wireless devices in a format that is best suited to those devices, Typically this data is displayed in a few lines of text, preferably a scrolling line of text data, to suit such mobile interactive transceivers. When connected within a vehicle, preferably such data is displayed at the interior rearview mirror.

As described in commonly assigned U.S. Pat. No. 6,477,464 issued to McCarthy et al., for a COMPLETE MIRROR-BASED GLOBAL-POSITIONING SYSTEM (GPS) NAVIGATION SOLUTION, which claims priority from U.S. provisional patent application Ser. No. 60/187,960 filed on Mar. 9, 2000, by McCarthy et al., for a COMPLETE MIRROR-BASED GLOBAL-POSITIONING SYSTEM (GPS) NAVIGATION SOLUTION, and U.S. Pat. No. 6,553,308 issued to Uhlmann et al., for a VEHICLE NAVIGATION SYSTEM WITH SMART MAP FILTERING, PORTABLE UNIT HOME-BASE REGISTRATION AND MULTIPLE NAVIGATION SYSTEM PREFERENTIAL USE, which claims priority from U.S. provisional application Ser. No. 60/131,593 filed on Apr. 29, 1999, by Uhlmann et al., for a VEHICLE-BASED NAVIGATION SYSTEM WITH A SMART MAP FILTERING, PORTABLE UNIT HOME-BASED REGISTRATION AND MULTIPLE NAVIGATION SYSTEM PREFERENTIAL USE, the disclosures of which are hereby incorporated herein by reference, provision of a display and particularly a scrolling text display at the interior rear view assembly of the vehicle (and/or the exterior rear view mirror assembly) has many advantages including ease of readability and recognition by the driver of the vehicle.

The interfacing of a mobile accessory to the vehicle via a wireless link, preferably a wireless IR link, can be further enhanced by linking to the vehicle's GPS system. The GPS system can provide location/directional information to the driver. This can facilitate a PUSH communication protocol whereby information and messages are automatically transmitted to the driver. Alternatively, or in addition, a PULL communication protocol can be used whereby the driver selects information at his/her request only. This optionally can be a user-defined option. For example, assume the vehicle equipped with the present invention is approaching a service/convenience/food supplier such as a Starbucks coffee location or a service station. The in-vehicle GPS system can alert the WAP hardware located either in the vehicle or, through the IrDA port, on the handheld device and offer a discount such as a $0.25 electronic coupon if the driver decides to stop for a particular purchase at that store. The vehicle location is wirelessly transmitted from the vehicle to a system such as ONSTAR™ available from General Motors or a similar system. The location of the vehicle is then provided to a service location proximate to the location of the vehicle or in the direction of travel of the vehicle. Such service provider(s) can then communicate wirelessly back to the vehicle specific information/service offers/discount information/advertisements, and the driver or other occupants of the vehicle can make decisions based on this received information and/or can specifically communicate with such service provider(s). Also, INTERNET and/or telemetry sites and services can be provided at a low cost or free to the driver, and with the compensation to the remote service provider be via advertisements received at the vehicle and displayed to the driver. By linking via the GPS system of the vehicle, such advertisements can be customized to suit the particular geographic location where the vehicle is located. Also, customized entertainment and/or information can be provided by wireless communication to the vehicle, such as from a digital satellite radio station, and with content, such as advertisements, local news broadcasts, weather data, traffic data, and the like, customized to the particular location of the vehicle via dynamic interactive communication that communicates GPS data concerning the vehicle location and heading, generated by an in-vehicle GPS system, from the vehicle to a remote receiver (such as a web site, telemetry service or media station) via wireless transmission and receiving of data to and from the vehicle, and, preferably, via an IrDA-port, to a mobile device such as a personal cell phone or PDA in the vehicle.

Another embodiment of the invention is the placement of mobile device communication ports such IrDA ports in the vehicle cabins of automobiles in a rental car fleet. Preferably, the communication port, such as an IrDA port, is placed at the interior rearview mirror assembly, as this is a central location that is readily accessed by a variety of drivers, many of who will be new to the type of rented model, but who will have had previous familiarity with accessing a mirror-mounted IrDA port. This would enable the temporary user of the vehicle access mobile communication and services as well as communication to the rental company if the vehicle breaks down or requires servicing. Certain vehicles could also be equipped with faxes and keyboards for a mobile office capable of sending and receiving information.

In addition to these features, the IrDA port can serve as the interface to systems within the mirror such as a palm-sized keyboard similar to a handheld PDA where the operator can compose, edit, and access systems located in the mirror. This system can be available as an option because, due to the open architecture of the IrDA port, the operator can also interface the system with the existing PDA, phone, or other mobile device capable of composing or editing messages. This provides a useful interface for the operator for entering street addresses and E-mail messages.

In addition, the interior rearview mirror assembly can aid in the interfacing of the mobile communication protocol/needs of a particular brand/model of Mobile device (such as, for example, a Palm Pilot™ PDA) to a particular vehicle model of a car manufacturer. For example, the vehicle bus system for a GM vehicle may be different than the architecture for a Ford vehicle. The interior mirror assembly in the respective model/brand of vehicle can function to allow the PalmPilot™, for example, owned by a person to interact with whatever automobile that person carries that PalmPilot™ into, whether a GM vehicle, a Ford vehicle or any other vehicle equipped with a mirror-mounted IrDA-port.

FIG. 1 illustrates an embodiment of the present invention. Minor-mounted wireless communication system 10 includes a mobile device 11 equipped with a mobile device communication port 12 (preferably an IrDA-port that transmits/receives data via infrared wireless communication). When data is input to mobile device 11 via input element 14 (which may be a keypad or a touch or stylus actuated screen), a communication signal 16 is wirelessly transmitted to mirror-mounted communication device 18 mounted at interior rearview mirror assembly 20 that is located within the interior cabin of a vehicle (not shown). Preferably, interior mirror assembly 20 is in electronic/data communication with the vehicle electronic system/accessories schematically represented by control 22 in FIG. 1, Control 22 links to vehicle-based telecommunication system 24 that provides a wireless telecommunication link from the vehicle to an external service/information provider.

Also, the mobile device may wirelessly communicate with the vehicle when the driver is approaching the vehicle when parked, such as to provide identity to the vehicle in order to activate/deactivate a security system, an entry system such as door locks, and the like. Also, the mobile device can take part in vehicle-based remote transactions, such as purchases, banking transactions, and the like, such as are described in commonly assigned U.S. Pat. No. 6,158,655, the disclosure of which is hereby incorporated herein by reference. The mobile device, such as a PDA, may include driver license, insurance, registration and similar data that can be displayed to the like of a police officer using a vehicle-based video screen. The vehicle can have built-in codes that authorize use of the vehicle by particular drivers/owners of particular mobile devices.

Figure 2:
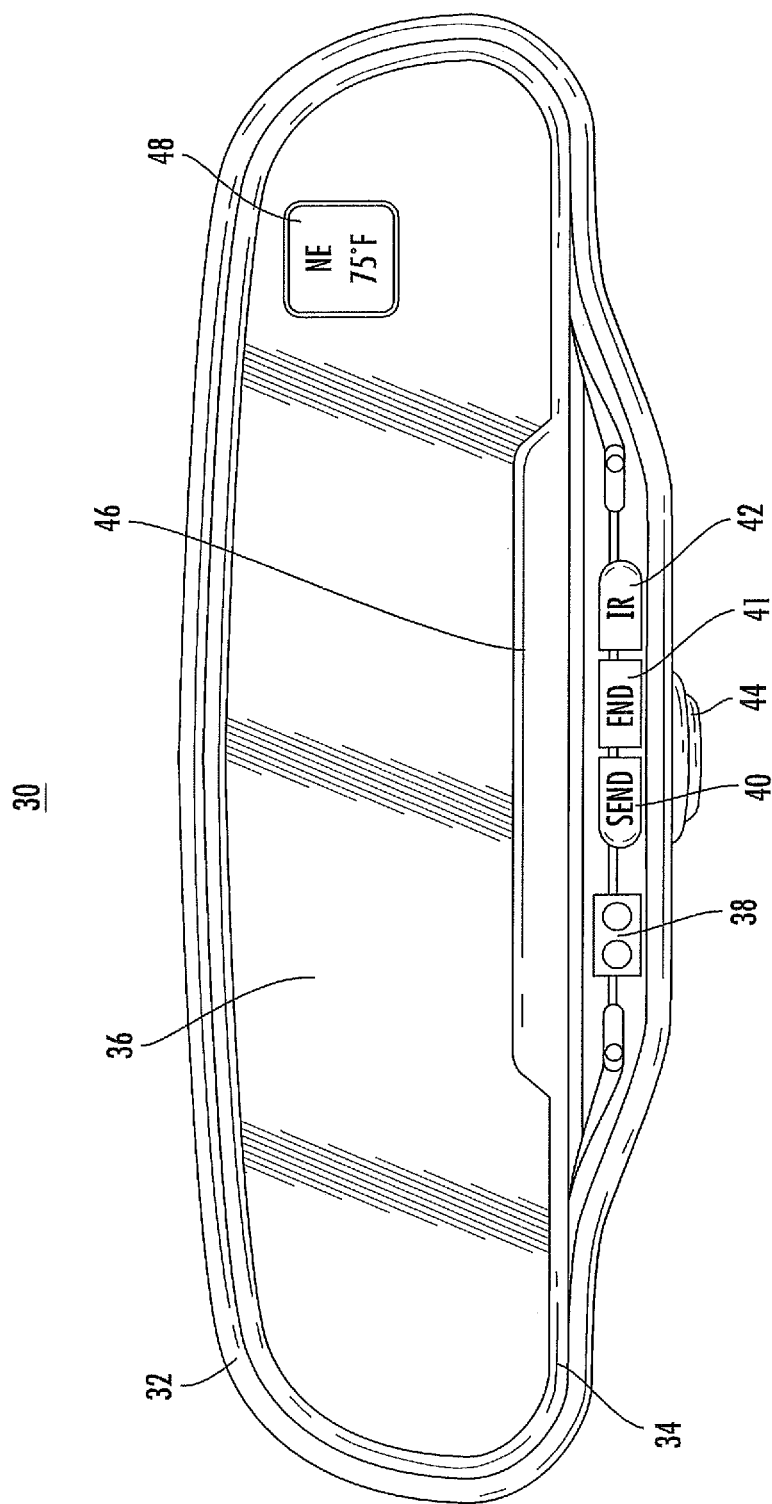
FIG. 2 is a front elevation of an interior rearview mirror assembly, according to the invention.

An interior rearview mirror system 30 incorporating the present invention is shown in FIG. 2. Interior rearview mirror assembly 32 includes a mirror reflector element 36 that is within mirror casing 34. Reflector element 36 may be a prismatic mirror element or an electrically variable reflectance element such as an electro-optic reflective element such as an electrochromic reflective element such as described in commonly assigned U.S. Pat. Nos. 5,140,455; 5,151,816; 5,567,360; 5,525,264; 5,610,756; 5,406,414; 5,253,109; 5,076,673; 5,073,012 or 5,117,346, which are hereby incorporated herein by reference, and in publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Washington (1990), the disclosures of which are hereby incorporated by reference herein in their entireties.

A communication transmitting and/or receiving data port 38 is located in the front, lower bezel portion of casing 34, below mirror reflector element 36. When mirror system 30 is mounted in a vehicle (such as attached to a vehicle windshield or to a vehicle header, as is known in the mirror art), communication port 38 is adapted to receive data from and/or transmit data to a mobile device (such as a PDA or a cellular phone) by wireless data communication. Preferably, communication port 38 comprises an IR data port. Manually operated controls, 40, 41 and 42, facilitate exchange of data between mirror system 30 and a mobile device, Mirror system 30 also includes a multi-text display 46, that preferably comprises a multi-pixel display, more preferably a reconfigurable display and most preferably a display capable of scrolling, such as described in commonly assigned U.S. Pat. No. 6,477,464 issued to McCarthy et al., for a COMPLETE MIRROR-BASED GLOBAL-POSITIONING SYSTEM (GPS) NAVIGATION SOLUTION, which claims priority from U.S. provisional application Ser. No. 60/187,960 filed on Mar. 9, 2000, by McCarthy et al., for a COMPLETE MIRROR-BASED GLOBAL-POSITIONING SYSTEM (GPS) NAVIGATION SOLUTION, and U.S. patent application Ser. No. 09/817,874, filed on Mar. 26, 2001, by Quist et al., for an INTERACTIVE AUTOMOTIVE REAR VISION SYSTEM, which claims priority from U.S. provisional application Ser. No. 60/192,721, filed on Mar. 27, 2000, by Lynam et al., for an INTERACTIVE AUTOMOTIVE REAR VISION SYSTEM, the disclosures of which are hereby incorporated herein by reference. Mirror system 30 also includes a display of compass direction and external or interior vehicular temperature.

Also, a mobile device in data communication with mirror system 30 can optionally attach to or dock with the interior mirror assembly, and/or can form a pendant accessory thereto, such as is described in commonly assigned U.S. Pat. No. 6,428,172 issued to Hutzel et al., for a REARVIEW MIRROR ASSEMBLY WITH UTILITY FUNCTIONS, the disclosure of which is hereby incorporated herein by reference.

Also, the mobile device can link to a vehicle bus system, such as a CAN or LIN system such as disclosed in commonly assigned U.S. Pat. No. 6,396,408 issued to Drummond et al., for a DIGITAL ELECTROCHROMIC CIRCUIT WITH A VEHICLE NETWORK, which claims priority from U.S. provisional patent application Ser. No. 60/196,577, filed on Mar. 31, 2000, by Lynam et al., for a DIGITAL ELECTROCHROMIC CIRCUIT WITH A VEHICLE NETWORK SUCH AS A CAR AREA NETWORK OR A LOCAL INTERCONNECT NETWORK, the disclosures of which are hereby incorporated herein by reference, via data communication with communication port 38 of mirror system 30.

Figure 3:
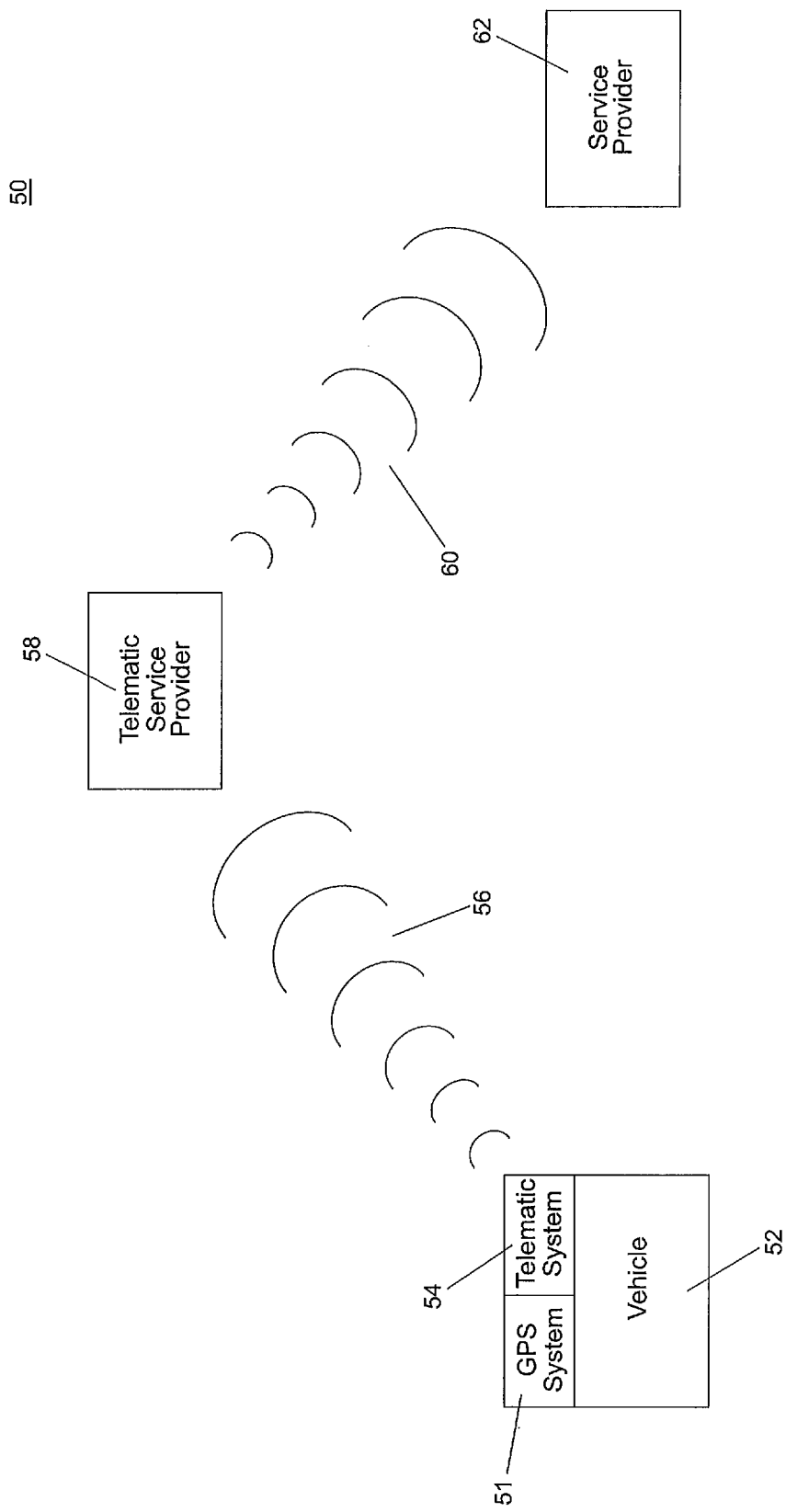
FIG. 3 is an electronic block diagram of a vehicle mirror-based wireless communication system, according to another aspect of the invention.

A vehicular dynamic interactive communication system 50 is shown in FIG. 3. Vehicle 52 includes an in-vehicle GPS system 51 that receives GPS information from a satellite system (not shown) that identifies the geographic location of the vehicle, and its direction while travelling on a highway. This data and other information, such as vehicle type, driver personal information, and the like, is processed by in-vehicle telematic system 54, which communicates via two-way wireless link 56 with a remote telematic service provider 58 (such as an ONSTAR™ system or a dial-in computer server or the like). Telematic service provider 58, upon identifying the location, identity and direction heading of vehicle 52, conveys this data via two-way communication link 60 (also, preferably, a wireless link) to a service provider 62 (such as a gas station, store, cinema, WEB site, toll center, banking center, satellite radio provider, and the like). Service provider 62, upon receipt of input data from vehicle 52 via link 60, provides data/information/service back to vehicle 52 via telematic service provider 58, and preferably with this data/information/service customized to the geographic location and heading of vehicle 52 as generated by GPS system 51.

Also, many mobile devices such as PDAs, cellular phones, and the like, require manual input of data. However, while driving in a car, this may be impractical and/or unsafe for the driver. By linking such mobile devices to a vehicle, as disclosed in the present invention, an in-vehicle voice detection/voice recognition/voice generation system, such as are described in commonly assigned U.S. Pat. No. 6,428,172 issued to Hutzel et al., for a REARVIEW MIRROR ASSEMBLY WITH UTILITY FUNCTIONS, and U.S. Pat. No. 6,420,975 issued to DeLine et al., for an INTERIOR REARVIEW MIRROR SOUND PROCESSING SYSTEM, the disclosures of which are hereby incorporated herein by reference, can be used to operate the mobile device while traveling in the vehicle. For example, by using an in-vehicle voice detection/recognition/generation system, and by linking a PDA to the vehicle as disclosed in the present invention, the driver can hear data stored in the PDA (such as calendar information, notes and the like) by playback via the vehicle audio system (and with the vehicle voice generation system receiving digital data stored in the PDA via wireless, or less desirably wired, link of the PDA to the vehicle and then converting this digital data to a simulated voice that reads the digital data to the driver via the vehicle audio system). Likewise, the in-vehicle voice detection/recognition/generation system can receive spoken words from the driver, convert these to digital data, and communicate this to the PDA.

The embodiments of the invention in which an exclusive property or privilege is claimed are defined as follows:

1. An interior rearview mirror system for a vehicle, said interior rearview mirror system comprising:
    an interior rearview mirror assembly including an interior mirror reflective element;
    a global positioning system operable to determine a geographical location of the vehicle;
    wherein data that is relevant to the geographical location of the vehicle is carried from an external provider to the vehicle via a wireless communication link; and
    a display device disposed at said interior rearview mirror assembly, wherein at least one of (a) said display device comprises a multi-pixel display device, (b) said display device is capable of displaying a scrolling display, (c) said display device is capable of displaying a multi-text display, (d) said display device is disposed behind said interior mirror reflective element, (e) said interior rearview mirror assembly comprises an electrochromic reflective element and wherein said display device is disposed behind said electrochromic reflective element, (f) said display device is disposed behind said interior mirror reflective element and said interior mirror reflective element comprises a semitransparent visible light reflecting/transmitting reflector and said display device comprising a display on demand display device, (g) said interior rearview mirror assembly comprises an electrochromic reflective element and wherein said display device is disposed behind said electrochromic reflective element, said electrochromic reflective element comprising a semitransparent visible light reflecting/transmitting reflector and said display device comprising a display on demand display device, and (h) said interior rearview mirror assembly comprises an electrochromic reflective element and wherein said display device is disposed behind said electrochromic reflective element, said electrochromic reflective element comprising a third surface semitransparent visible light reflecting/transmitting reflector and said display device comprising a display on demand display device.

2. The interior rearview mirror system of claim 1, wherein said data is wirelessly communicated from said external provider to the vehicle responsive to at least one of (a) location of the vehicle, (b) identity of the vehicle and (c) directional heading of the vehicle, and wherein said data is at least in part customized to the geographic location of the vehicle.

3. The interior rearview mirror system of claim 2, wherein said external provider receives transmitted data from the vehicle via said wireless communication link and, responsive to receipt of said transmitted data from the vehicle, said external provider wirelessly communicates said data to the vehicle.

4. The interior rearview mirror system of claim 3, wherein said transmitted data includes at least one of a current geographic location of the vehicle and a current directional heading of the vehicle.

5. The interior rearview mirror system of claim 2, wherein said external provider comprises a telematic service provider.

6. The interior rearview mirror system of claim 5, wherein said telematic service provider communicates data associated with at least one of a gas station, a store, a cinema, a web site, a toll center, a banking center and a satellite radio.

7. The interior rearview mirror system of claim 1, wherein said interior rearview mirror assembly comprises a user input.

8. The interior rearview mirror system of claim 7, wherein said interior rearview mirror assembly comprises a user control for said wireless communication link.

9. The interior rearview mirror system of claim 1, wherein said wireless communication link is operable to carry data via at least one of a PUSH communication protocol and a PULL communication protocol.

10. The interior rearview mirror system of claim 9, wherein said wireless communication link is operable in response to a user input selecting at least one of said PUSH and PULL communication protocols.

11. The interior rearview mirror system of claim 1, wherein said display device comprises a reconfigurable display device.

12. The interior rearview mirror system of claim 1, wherein said interior rearview mirror system comprises a link to a vehicle bus system.

13. The interior rearview minor system of claim 1, wherein said interior rearview mirror system comprises a link with a mobile accessory that is a personal accessory of an occupant of the vehicle.

14. The interior rearview mirror system of claim 13, wherein at least one of (a) said mobile accessory comprises at least one of a keypad, a touch pad and a stylus-actuated screen, (b) said interior rearview mirror system comprises a holder in the vehicle for said mobile accessory, and (c) said mobile accessory comprises at least one of a hand-held telephone, a personal digital assistant, a hand-held personal identifier, and a hand-held remote entry device.

15. The interior rearview mirror system of claim 1, wherein at least one of (a) an in-vehicle voice input device is at said interior rearview mirror assembly of the vehicle, (b) said interior rearview mirror system includes in-vehicle voice detection, (c) said interior rearview mirror system includes voice recognition and (d) said interior rearview minor system includes in-vehicle voice generation.

16. An interior rearview mirror system for a vehicle, said interior rearview mirror system comprising:
   an interior rearview mirror assembly including an interior mirror reflective element;
   a global positioning system operable to determine a geographical location of the vehicle;
   wherein data that is relevant to the geographical location of the vehicle is carried from an external provider to the vehicle via a wireless communication link;
   wherein said data is wirelessly communicated from said external provider to the vehicle responsive to at least one of (a) location of the vehicle, (b) identity of the vehicle and (c) directional heading of the vehicle, and wherein said data is at least in part customized to the geographic location of the vehicle; and
   a display device disposed at said interior rearview mirror assembly, wherein at least one of (a) said display device comprises a reconfigurable display, (b) said display device comprises a multi-pixel display device, (c) said display device is capable of displaying a scrolling display, (d) said display device is capable of displaying a multi-text display, (e) said display device is disposed behind said interior mirror reflective element, (f) said interior rearview mirror assembly comprises an electrochromic reflective element and wherein said display device is disposed behind said electrochromic reflective element, (g) said display device is disposed behind said interior mirror reflective element and said interior minor reflective element comprises a semitransparent visible light reflecting/transmitting reflector and said display device comprising a display on demand display device, (h) said interior rearview mirror assembly comprises an electrochromic reflective element and wherein said display device is disposed behind said electrochromic reflective element, said electrochromic reflective element comprising a semitransparent visible light reflecting/transmitting reflector and said display device comprising a display on demand display device, and (i) said interior rearview mirror assembly comprises an electrochromic reflective element and wherein said display device is disposed behind said electrochromic reflective element, said electrochromic reflective element comprising a third surface semitransparent visible light reflecting/transmitting reflector and said display device comprising a display on demand display device.

17. The interior rearview mirror system of claim 16, wherein said external provider receives transmitted data from the vehicle via said wireless communication link and, responsive to receipt of said transmitted data from the vehicle, said external provider wirelessly communicates said data to the vehicle.

18. The interior rearview mirror system of claim 17, wherein said transmitted data includes at least one of a current geographic location of the vehicle and a current directional heading of the vehicle.

19. The interior rearview mirror system of claim 16, wherein said wireless communication link is operable to carry data via at least one of a PUSH communication protocol and a PULL communication protocol, and wherein said wireless communication link is operable in response to a user input selecting at least one of said PUSH and PULL communication protocols.

20. The interior rearview mirror system of claim 16, wherein said interior rearview mirror system comprises a link with a mobile accessory that is a personal accessory of an occupant of the vehicle, and wherein at least one of (a) said mobile accessory comprises at least one of a keypad, a touch pad and a stylus-actuated screen, (b) said interior rearview mirror system comprises a holder in the vehicle for said mobile accessory, and (c) said mobile accessory comprises at least one of a hand-held telephone, a personal digital assistant, a hand-held personal identifier, and a hand-held remote entry device.

21. An interior rearview mirror system for a vehicle, said interior rearview mirror system comprising:
   an interior rearview mirror assembly including an interior minor reflective element;
   wherein said interior rearview mirror system comprises a link with a mobile accessory that is a personal accessory of an occupant of the vehicle, and wherein said mobile accessory comprises at least one of a keypad, a touch pad and a stylus-actuated screen;
   wherein at least one of (a) an in-vehicle voice input device is at said interior rearview mirror assembly of the vehicle, (b) said interior rearview mirror system includes in-vehicle voice detection, (c) said interior rearview mirror system includes voice recognition and (d) said interior rearview mirror system includes in-vehicle voice generation; and
   a display device disposed at said interior rearview mirror assembly, wherein at least one of (a) said display device comprises a reconfigurable display, (b) said display device comprises a multi-pixel display device, (c) said display device is capable of displaying a scrolling display, (d) said display device is capable of displaying a multi-text display, (e) said display device is disposed behind said interior mirror reflective element, (f) said interior rearview mirror assembly comprises an electrochromic reflective element and wherein said display device is disposed behind said electrochromic reflective element, (g) said display device is disposed behind said interior mirror reflective element and said interior mirror reflective element comprises a semitransparent visible light reflecting/transmitting reflector and said display device comprising a display on demand display device, (h) said interior rearview mirror assembly comprises an electrochromic reflective element and wherein said display device is disposed behind said electrochromic reflective element, said electrochromic reflective element comprising a semitransparent visible light reflecting/transmitting reflector and said display device comprising a display on demand display device, and (i) said interior rearview mirror assembly comprises an electrochromic reflective element and wherein said display device is disposed behind said electrochromic reflective element, said electrochromic reflective element comprising a third surface semitransparent visible light reflecting/transmitting reflector and said display device comprising a display on demand display device.

22. The interior rearview mirror system of claim 21, wherein said interior rearview mirror system comprises a link to a vehicle bus system.

23. The interior rearview mirror system of claim 21, comprising a global positioning system operable to determine a geographical location of the vehicle, wherein data that is relevant to the geographical location of the vehicle is carried from an external provider to the vehicle via a wireless communication link.

24. The interior rearview mirror system of claim 23, wherein said external provider receives transmitted data from the vehicle via said wireless communication link and, responsive to receipt of said transmitted data from the vehicle, said external provider wirelessly communicates said data to the vehicle.

25. An interior rearview mirror system for a vehicle, said interior rearview mirror system comprising:

an interior rearview mirror assembly including an interior mirror reflective element;

wherein at least one of (a) an in-vehicle voice input device is at said interior rearview mirror assembly of the vehicle, (b) said interior rearview mirror system includes in-vehicle voice detection, (c) said interior rearview mirror system includes voice recognition and (d) said interior rearview mirror system includes in-vehicle voice generation;

a global positioning system operable to determine a geographical location of the vehicle;

a display device disposed at said interior rearview mirror assembly, wherein at least one of (a) said display device comprises a reconfigurable display, (b) said display device comprises a multi-pixel display device, (c) said display device is capable of displaying a scrolling display, (d) said display device is capable of displaying a multi-text display, (e) said display device is disposed behind said interior mirror reflective element, (f) said interior rearview mirror assembly comprises an electrochromic reflective element and wherein said display device is disposed behind said electrochromic reflective element, (g) said display device is disposed behind said interior mirror reflective element and said interior mirror reflective element comprises a semitransparent visible light reflecting/transmitting reflector and said display device comprising a display on demand display device, (h) said interior rearview mirror assembly comprises an electrochromic reflective element and wherein said display device is disposed behind said electrochromic reflective element, said electrochromic reflective element comprising a semitransparent visible light reflecting/transmitting reflector and said display device comprising a display on demand display device, and (i) said interior rearview mirror assembly comprises an electrochromic reflective element and wherein said display device is disposed behind said electrochromic reflective element, said electrochromic reflective element comprising a third surface semitransparent visible light reflecting/transmitting reflector and said display device comprising a display on demand display device.

26. The interior rearview mirror system of claim 25, wherein data that is relevant to the geographical location of the vehicle is carried from an external provider to the vehicle via a wireless communication link.

* * * * *

UNITED STATES PATENT AND TRADEMARK OFFICE
CERTIFICATE OF CORRECTION

| | |
|---|---|
| PATENT NO. | : 8,525,703 B2 |
| APPLICATION NO. | : 13/050133 |
| DATED | : September 3, 2013 |
| INVENTOR(S) | : Kevin C. McCarthy and Niall R. Lynam |

It is certified that error appears in the above-identified patent and that said Letters Patent is hereby corrected as shown below:

In the Specification

Column 4:
Line 20, "Mx," should be --IIIx--
Line 38, "minor" should be --mirror--

Column 5:
Line 52, "devices," should be --devices.--

Column 7:
Line 30, "Minor" should be --Mirror--

Column 8:
Line 24, "device," should be --device.--

In the Claims

Column 10:
Line 59, Claim 13, "minor" should be --mirror--

Column 11:
Line 9, Claim 15, "minor" should be --mirror--
Line 12, Claim 16, "comprising;" should be --comprising:--
Line 38, Claim 16, "minor" should be --mirror--

Column 12:
Line 20, Claim 21, "minor" should be --mirror--

Signed and Sealed this
Twenty-fifth Day of November, 2014

Michelle K. Lee
*Deputy Director of the United States Patent and Trademark Office*